United States Patent
Makino et al.

(10) Patent No.: US 8,594,753 B2
(45) Date of Patent: Nov. 26, 2013

(54) MOBILE TERMINAL

(75) Inventors: Minoru Makino, Osaka (JP); Yuta Saito, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 18 days.

(21) Appl. No.: 13/508,640

(22) PCT Filed: Sep. 24, 2010

(86) PCT No.: PCT/JP2010/005777
§ 371 (c)(1),
(2), (4) Date: May 8, 2012

(87) PCT Pub. No.: WO2011/055480
PCT Pub. Date: May 12, 2011

(65) Prior Publication Data
US 2012/0231859 A1    Sep. 13, 2012

(30) Foreign Application Priority Data
Nov. 9, 2009    (JP) .................... 2009-256550

(51) Int. Cl.
*H04M 1/00*    (2006.01)
*H04M 9/00*    (2006.01)
*H05K 5/00*    (2006.01)
*H05K 7/00*    (2006.01)

(52) U.S. Cl.
USPC ............... 455/575.3; 379/433.13; 361/679.06

(58) Field of Classification Search
USPC ............ 455/575.1, 575.3, 575.4; 379/433.01, 379/433.04, 433.11, 433.13; 361/679.06
See application file for complete search history.

(56) References Cited

U.S. PATENT DOCUMENTS

| 2006/0172764 A1 | 8/2006 | Makino |
| 2008/0045279 A1* | 2/2008 | Ohki ........................ 455/575.1 |
| 2008/0096619 A1 | 4/2008 | Kuga et al. |
| 2010/0029348 A1* | 2/2010 | Lee et al. .................. 455/575.4 |
| 2011/0032667 A1 | 2/2011 | Kobayashi et al. |

FOREIGN PATENT DOCUMENTS

| JP | 2005-109971 A | 4/2005 |
| JP | 2006-191668 A | 7/2006 |
| JP | 2006-211576 A | 8/2006 |
| JP | 2007-49294 A | 2/2007 |
| JP | 2008-103989 A | 5/2008 |
| JP | 2009-200753 A | 9/2009 |
| WO | WO 2009/123250 A | 10/2009 |

* cited by examiner

*Primary Examiner* — Nguyen Vo
(74) *Attorney, Agent, or Firm* — Birch, Stewart, Kolasch & Birch, LLP

(57) ABSTRACT

The mobile terminal includes the rotary housing and the rotation support mechanism for supporting the rotary housing so as to rotate between the vertical position and the horizontal position. The rotation support mechanism includes a guide plate. A first slide pin and a second slide pin sliding relative to the guide plate upon rotation of the rotary housing are connected to the rotary housing. A guide hole for restricting sliding of the first slide pin is formed in the guide plate. The second slide pin and a rotary shaft provided in the guide plate are connected together through a linking member.

12 Claims, 40 Drawing Sheets

MOBILE TERMINAL

TECHNICAL FIELD

The present invention relates to a mobile terminal in which a rotary housing is supported so as to rotate between a vertical position and a horizontal position.

BACKGROUND ART

In recent years, with a start of digital terrestrial broadcasting, mobile terminals as represented by mobile phones each have been designed so as to have a function to receive TV signals and a function to connect the mobile terminal to the Internet. Thus, for the mobile terminals, it is required that portability thereof is improved and that easiness of viewing an image is achieved by expanding a display screen. In addition, considering nature of TV images and Internet site images, there is a need for TV viewing and an Internet connection using a display screen in a horizontal position.

Thus, as in, e.g., Patent Document 1, a foldable mobile phone has been known, in which first and second housings are foldably connected together through a hinge part and the first housing is supported such that a liquid crystal display part is switchable between a vertical position and a horizontal position. The foldable mobile phone includes a convexly-curved horizontal guide groove formed in a guide plate so as to extend in the horizontal direction, a linear vertical guide groove formed in the guide plate so as to extend in the vertical direction, a first guide pin provided on a back side of the liquid crystal display part so as to be slidably engaged with the horizontal guide groove, and a second guide pin provided on the back side of the liquid crystal display part so as to be slidably engaged with the vertical guide groove.

CITATION LIST

Patent Document

Patent Document 1: Japanese Patent Publication No. 2006-211576

SUMMARY OF THE INVENTION

Technical Problem

However, since it is required for the liquid crystal display part particularly in the horizontal position to resist torsion force on the first housing, the foldable mobile phone of Patent Document 1 is configured such that engagement parts of the pair of guide pins are firmly engaged with the guide grooves, respectively. Thus, the foldable mobile phone has the structure in which friction is likely to occur between the guide pin and the guide groove, resulting in a problem that biasing force of a torsion coil spring is less likely to be transmitted to the liquid crystal display part and cannot fully act to assist in rotating the liquid crystal display part.

In addition, if the liquid crystal display part is expanded, it is required that, in order to prevent contact of the liquid crystal display part with the hinge part, an upper end position of the vertical guide groove is raised. In such a state, since a peripheral edge of the vertical guide groove is positioned at an upper end of the guide plate, the size of the guide plate is increased, and therefore the size of the first housing is increased. If an upper end of the first housing arranged on the back side of the liquid crystal display part protrudes beyond an upper end of the liquid crystal display part in the horizontal position, the appearance of the foldable mobile phone is degraded. In order to avoid such appearance degradation, it is inevitable that an upper end position of the liquid crystal display part in the horizontal position is raised. As a result, there is a problem that the appearance of the foldable mobile phone is degraded due to a clearance formed between a lower end of the liquid crystal display part in the horizontal position and the hinge part.

The present invention has been made in view of the foregoing, and it is an objective of the present invention to enhance the appearance of a mobile terminal with reduced friction resistance of a rotation support mechanism and a reduced size of the mobile terminal.

Solution to the Problem

In order to accomplish the foregoing objective, a second slide member and a rotary shaft provided in a guide plate are connected together through a linking member in the present invention.

Specifically, a first aspect of the invention is intended for a mobile terminal including a rotary housing; and a rotation support mechanism for supporting the rotary housing such that the rotary housing rotates between a vertical position and a horizontal position. The rotation support mechanism includes a guide plate, first and second slide members connected to the rotary housing and sliding along the guide plate upon rotation of the rotary housing, a guide hole formed in the guide plate and restricting sliding of the first slide member, and a linking member connecting the second slide member to a rotary shaft provided in the guide plate.

According to the foregoing configuration, movement of the first slide member relative to the guide plate is restricted by the guide hole, and movement of the second slide member relative to the guide plate in association with the movement of the first slide member is restricted by the linking member. A rotation pattern of the rotary housing connected to the first and second slide members, the movement of each of which is restricted, is controlled. Since the second slide member does not slide along the guide hole during the rotation of the rotary housing as in the first slide member, friction resistance of the second slide member is reduced, resulting in smooth rotation of the rotary housing. Since a guide hole is not required for the second slide member, the guide plate is not necessarily provided so as to extend above an upper end of a pin slidable region of the guide hole. Thus, an upper end position of the guide plate is lowered, thereby lowering the position of the rotary housing in the horizontal position. As a result, a height difference between the position of a lower side of the rotary housing in the vertical position and the position of a lower side of the rotary housing in the horizontal position can be reduced, thereby enhancing the appearance of the mobile terminal.

A second aspect of the invention is intended for the mobile terminal of the first aspect of the invention, in which a circular recess is formed around the second slide member, and a rail fitted into the circular recess and restricting the second slide member such that the second slide member is not displaced in a thickness direction of the guide plate is formed above the guide hole in the guide plate.

According to the foregoing configuration, the second slide members moves in the state in which the rail is fitted into the circular recess of the second slide member. Thus, the second slide member is not displaced in the thickness direction of the guide plate, and the rotary housing stably rotates. In such a case, since only part of the circular recess slidably contacts the rail 15, the friction resistance is smaller as compared to a conventional case where both ends of a second slide member slidably contact a peripheral edge of a guide hole.

A third aspect of the invention is intended for the mobile terminal of the first or second aspect of the invention, in which a distance between the second slide member and the guide hole when the rotary housing is in the horizontal position is shorter than that when the rotary housing is in the vertical direction.

According to the foregoing configuration, the shape of the guide hole is adjusted, and therefore the distance between the second slide member and the guide hole when the rotary housing is in the horizontal position is shortened. As a result, even if the size of the rotary housing is large, the height difference between the position of the lower side of the rotary housing in the vertical position and the position of the lower side of the rotary housing in the horizontal position can be easily reduced.

A fourth aspect of the invention is intended for the mobile terminal of any one of the first to third aspects of the invention, in which the guide plate and the linking member are plates, the first and second slide members are connected together through a plate-shaped connection member arranged on one side of the guide plate, the linking member is arranged on the other side of the guide plate, and the guide plate is sandwiched between the connection member and the linking member.

According to the foregoing configuration, since the guide plate is sandwiched between the connection member and the linking member in the state in which the first and second slide members are connected together through the connection member, the rotation support mechanism can be assembled into a unit. Thus, assembly of the mobile terminal can be significantly improved. In addition, since the guide plate, the linking member, and the connection members are the plates, the thickness of the rotation support mechanism can be limited, thereby limiting the thickness of the entirety of the mobile terminal.

A fifth aspect of the invention is intended for the mobile terminal of the fourth aspect of the invention, in which an elastic member assisting in the rotation of the rotary housing is connected to at least one of the connection member or the linking member, and the elastic member is attached to the guide plate in a state in which the first and second slide members are connected together through the connection member.

According to the foregoing configuration, since the friction resistance on the second slide member is small, the function to assist in the rotation of the rotary housing by the elastic member is fulfilled. In addition, since the elastic member and the guide plate can be assembled into a unit, the assembly of the mobile terminal is facilitated.

A sixth aspect of the invention is intended for the mobile terminal of the fifth aspect of the invention, in which the elastic member is an torsion coil spring, at one end thereof, rotatably connected to an upper end part of the guide plate on a side on which the connection member is arranged and, at the other end, rotatably connected to the linking member on the side with the torsion coil spring passing through a spring opening formed along the rail.

According to the foregoing configuration, the torsion coil spring does not directly bias the second slide member (rotary housing) at the end at which the torsion coil spring is connected to the linking member, but biases the second slide member through the linking member. Thus, the principle of leverage can be used, and it is likely to fulfill the function to assist in the rotation of the rotary housing. In addition, since a connection part where the torsion coil spring is connected to the linking member at the end can be arranged in a dead space of the spring opening, the thickness of the rotation support mechanism can be limited.

A seventh aspect of the invention is intended for the mobile terminal of the fifth aspect of the invention, in which the elastic member is an torsion coil spring, at one end thereof, rotatably connected to an upper end part of the rail and, at the other end, rotatably connected to the linking member, and a coiled part of the torsion coil spring is arranged near the rail in such a position that the coiled part does not overlap with part of the guide plate on a side opposite to the second slide member, and a height of the coiled part is equal to or less than a sum of thicknesses of the guide plate, the connection member, and the linking member.

According to the foregoing configuration, the coiled part determining the height (thickness) of the elastic member in a direction in which the number of turns of the coiled part increases is arranged near the rail so as not to overlap with the guide plate, and the height of the coiled part is equal to or less than the sum of the thicknesses of the guide plate, the connection member, and the linking member. Thus, the thickness of the rotation support mechanism does not increase due to the torsion coil spring.

An eighth aspect of the invention is intended for the mobile terminal of any one of the first to seventh aspects of the invention, in which a movement opening in which movement of the rotation support mechanism is allowed is formed in the middle of a side surface of the rotary housing in a thickness direction thereof.

According to the foregoing configuration, when the rotary housing is in the vertical position or the horizontal position, the rotation support mechanism can be accommodated in the movement opening of the rotary housing. Thus, the rotation support mechanism does not protrude, thereby enhancing the appearance of the mobile phone. Since the rotation support mechanism always moves in the movement opening during the rotation of the rotary housing, the rotation support mechanism is loosened only in a clearance between the rotation support mechanism and the movement opening. Even if an unexpected impact is applied to the rotary housing, a load is also transmitted to the periphery of the movement opening. Thus, concentration of the load only on the rotation support mechanism is prevented, and therefore it is less likely to damage the rotation support mechanism. In addition, since the thickness of the rotation support mechanism is limited, the width of the movement opening is reduced, and therefore the thickness of the rotary housing 3 is also reduced.

A ninth aspect of the invention is intended for the mobile terminal of the eighth aspect of the invention, which further includes a lower closing member configured to, by the rotation support mechanism moving in the movement opening, be slid and tilt in the thickness direction of the rotary housing to close part of the movement opening at a lower corner of the rotary housing in the horizontal position or to be accommodated in the rotary housing in the vertical position. The lower closing member includes a lower closing member body arranged at the lower corner of the rotary housing, and a plate spring biasing the lower closing member body in a direction in which the movement opening is closed.

According to the foregoing configuration, when the rotary housing is switched to the vertical position, the lower closing member closing part of the movement opening at the lower corner of the rotary housing in the horizontal position is slid and tilts in the thickness direction of the rotary housing by being pushed by the rotary mechanism moving in the movement opening, and then is accommodated in the rotary housing. Thus, the lower closing member does not block the rotation of the rotary housing. The movement opening through which the rotation support mechanism comes out when the rotary housing rotates from the vertical position to the horizontal position is gradually closed by the lower closing member sliding out from the rotary housing. Thus, since the movement opening is closed in both of the vertical position and the horizontal position, the appearance of the mobile terminal is enhanced, and dust does not enter through the movement opening. In addition, the plate spring biases the lower closing member in the direction in which the movement opening is closed. When the rotation support mechanism rotates from the vertical position in which the lower closing member is accommodated in the movement opening to the horizontal position, the lower closing member body is biased by the plate spring to automatically close the movement opening. Thus, an opening/closing operation of the lower closing member is not required.

A tenth aspect of the invention is intended for the mobile terminal of the ninth aspect of the invention, in which the rotation support mechanism is covered by a thin plate made of metal, and the lower closing member body is a resin mold component.

According to the foregoing configuration, even if the lower closing member body is in a complex shape, molding and painting thereof are facilitated. Thus, the appearance of the mobile terminal in the state in which the movement opening is closed is enhanced. In addition, the rotation support mechanism is covered by the thin metal plate. Thus, when the resin mold component and the thin metal plate slidably contact each other, the resin mold component and the thin metal plate more smoothly slide against each other as compared to the case where metal components slidably contact each other, and it is less likely that the paint is chipped. Further, the resin mold component is used. Thus, even if the resin mold component tilts during the rotation of the rotary housing, the resin mold component does not provide an adverse effect on electronic components of the mobile terminal as in the case where a metal component is used.

An eleventh aspect of the invention is intended for the mobile terminal of the ninth or tenth aspect of the invention, in which a retaining part for preventing detachment of the lower closing member body from the rotary housing upon assembly is provided in the lower closing member body.

According to the foregoing configuration, when the lower closing member body is temporarily fixed to the rotary housing, the retaining part prevents the detachment of the lower closing member body, thereby facilitating the assembly.

A twelfth aspect of the invention is intended for the mobile terminal of any one of the first to eleventh aspects of the invention, in which the rotation support mechanism is connected to a fixed housing, the rotary housing and the fixed housing are foldably connected together through a hinge part, and an end part of the guide plate on a side closer to the hinge part is bent, and a hinge shaft including a biasing mechanism for assisting in a folding operation of the rotary housing and the fixed housing is unrotatably attached to a hinge shaft insertion hole formed in a bent part of the guide plate.

According to the foregoing configuration, since the hinge shaft including the biasing mechanism for assisting in the folding operation of the rotary housing and the fixed housing is directly attached to the guide plate connected to the rotary housing through the first and second slide members, it is less likely to cause loosening as compared to a conventional case where a hinge shaft configured as a separate component is attached to a housing covering a support mechanism. Thus, the loosening of the rotary housing and the fixed housing is reduced. In addition, since no guide hole for the second slide member is required as compared to a conventional case, the upper end position of the guide plate is lowered. Thus, an upper side position of the rotary housing in the horizontal position can be lowered. As a result, a clearance between the hinge part and the lower side of the rotary housing in the horizontal position is narrowed, thereby enhancing the appearance of the mobile terminal.

Advantages of the Invention

As described above, according to the present invention, the first and second slide members connected to the rotary housing and the guide hole restricting the sliding of the first slide member are provided in the guide plate of the rotation support mechanism, and the second slide member and the rotary shaft provided in the guide plate are connected together through the linking member. Thus, the appearance of the mobile phone can be enhanced with the reduced friction resistance of the rotation support mechanism and the reduced size of the mobile phone.

DESCRIPTION OF EMBODIMENTS

An embodiment of the present invention will be described below with reference to drawings.

Figure 2:
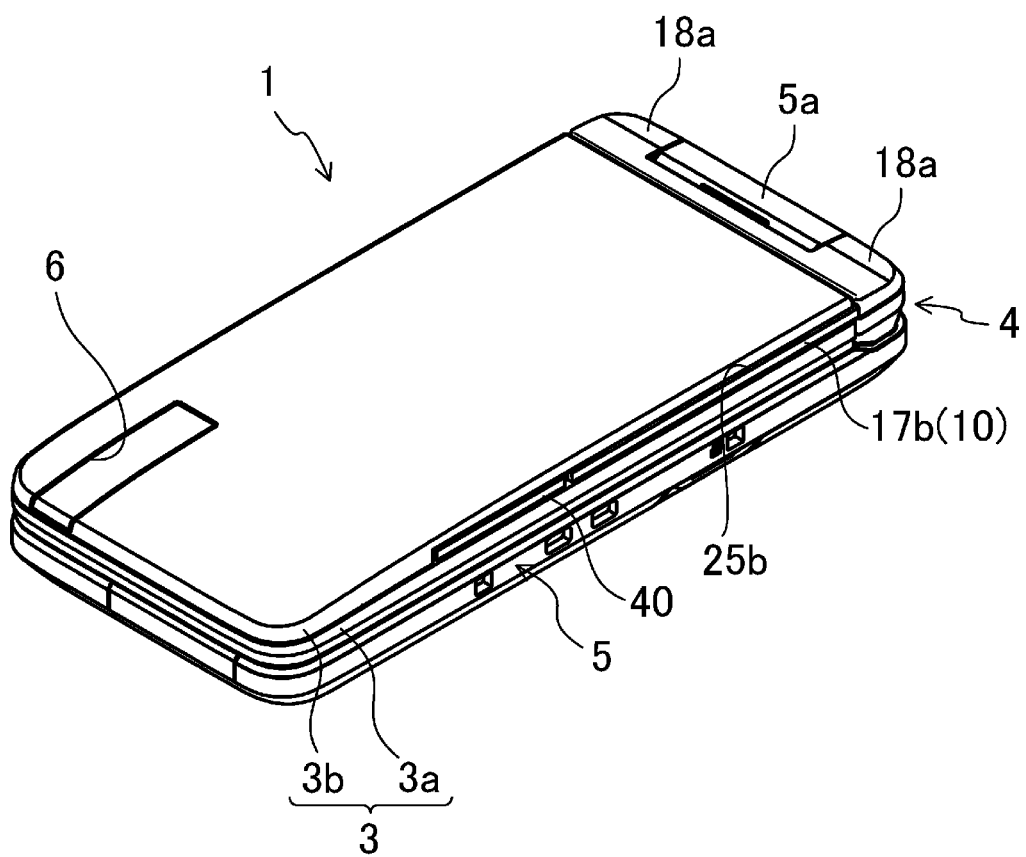
FIG. 2 is a perspective view illustrating a mobile phone in a closed position.
Figure 3:
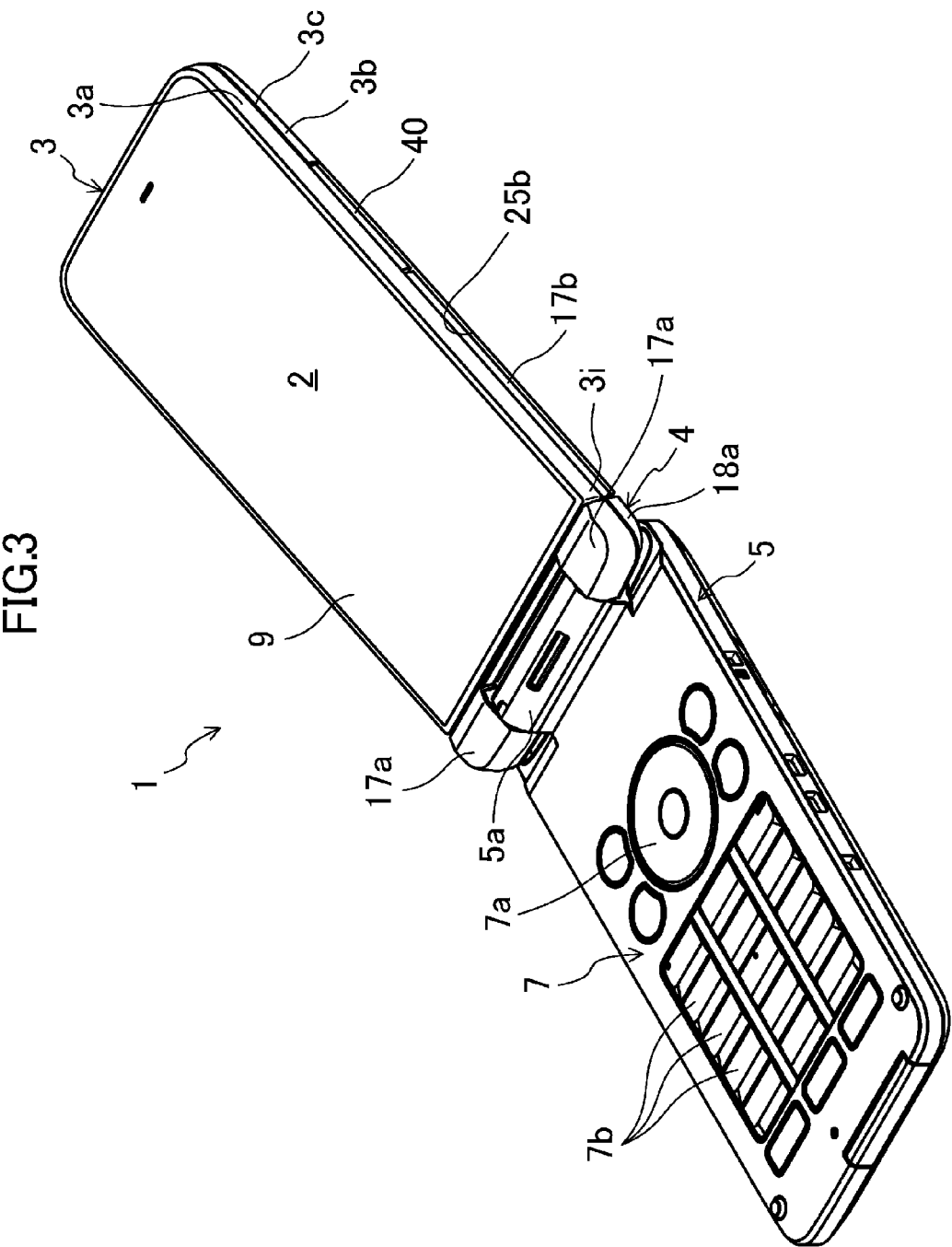
FIG. 3 is a perspective view illustrating the mobile phone from a front side thereof when the rotary housing is in the vertical position.

As illustrated in FIGS. 2-8, a foldable mobile phone 1 described as a mobile terminal of the embodiment of the present invention includes, on a front side thereof, a thin plate-shaped rotary housing 3 in which a display 2 is incorporated. The rotary housing 3 is foldably connected to a fixed housing 5 through a hinge part 4. When the rotary housing 3 and the fixed housing 5 are folded against each other as illustrated in FIG. 2, the mobile phone 1 is in a thin rectangular parallelepiped shape. On the other hand, as illustrated in FIG. 3, when the rotary housing 3 opens about the hinge part 4, the elongated display 2 appears on a front side of the mobile phone 1.

Figure 6:
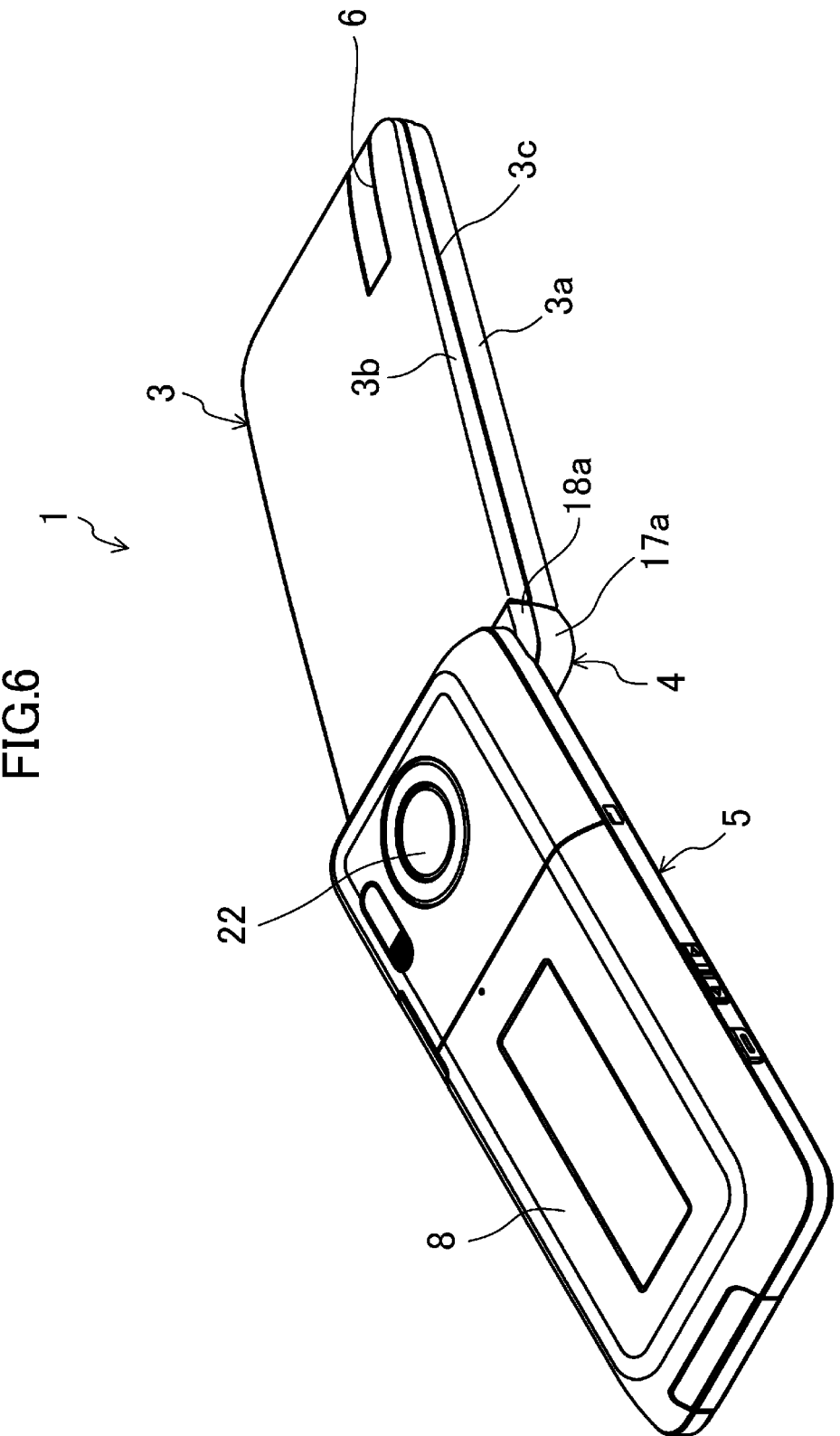
FIG. 6 is a perspective view illustrating the mobile phone from a back side thereof when the rotary housing is in the vertical position.

As illustrated in FIG. 3, an operation part 7 by which the mobile phone 1 is operated to perform various functions thereof is incorporated in the fixed housing 5, and a function key 7a and letter keys 7b are arranged on, e.g., the front side of the mobile phone 1. Letters on the keys 7a and 7b are drawn so as to be legible when the fixed housing 5 is held in a vertical position. A main substrate which is not shown in the figure is arranged on a back side of the keys 7a and 7b. As illustrated in FIG. 6, a rectangular battery cover 8 is provided on a back side of the fixed housing 5, and a battery (not shown in the figure) is provided under the battery cover 8. In addition, a camera 22 is provided in the fixed housing 5. A camera having a simple configuration may be also provided in the rotary housing 3. A TV tuner which is not shown in the figure is incorporated in the rotary housing 3 or the fixed housing 5, and TV signals can be received by the TV tuner.

Figure 9:
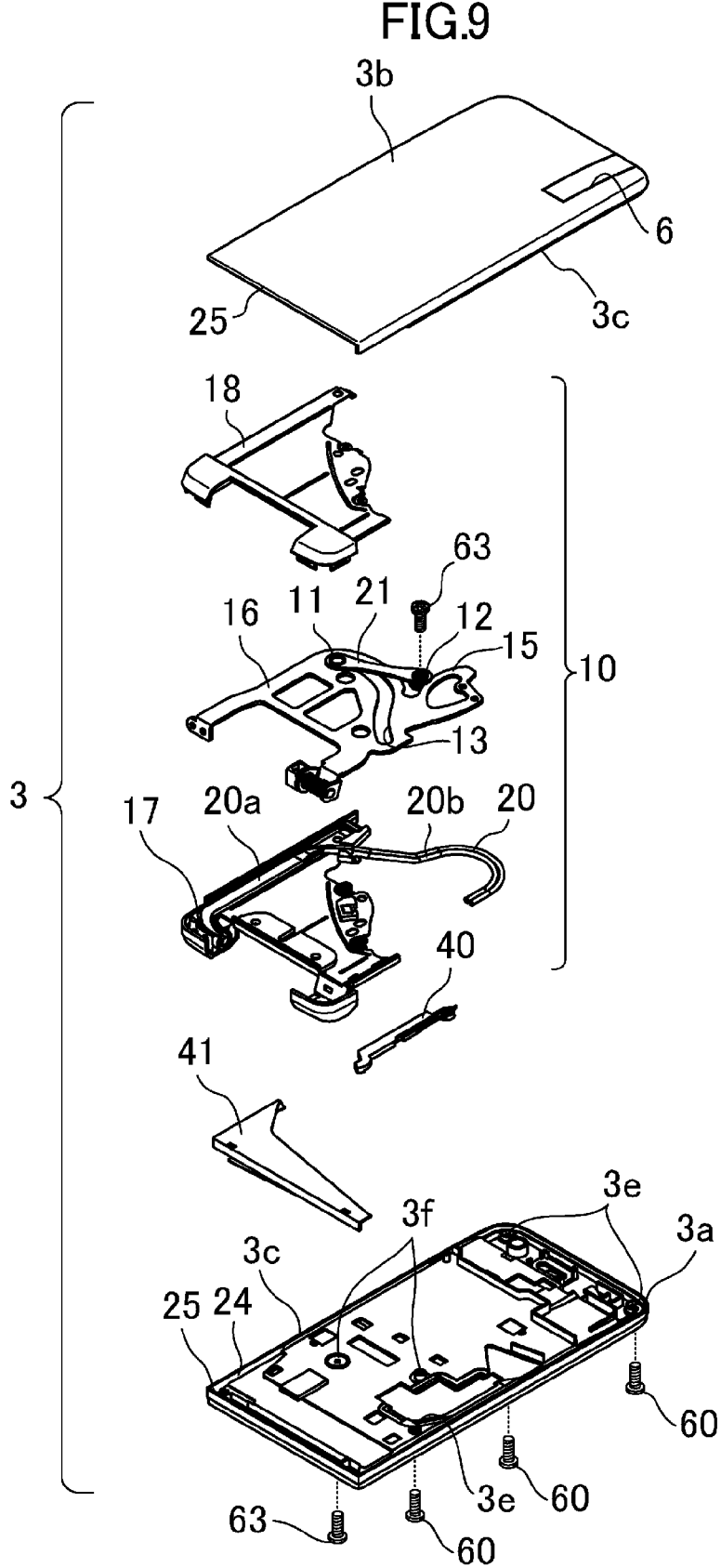
FIG. 9 is an exploded perspective view of the rotary housing and the rotation support mechanism from a back side of the rotary housing.
Figure 10:
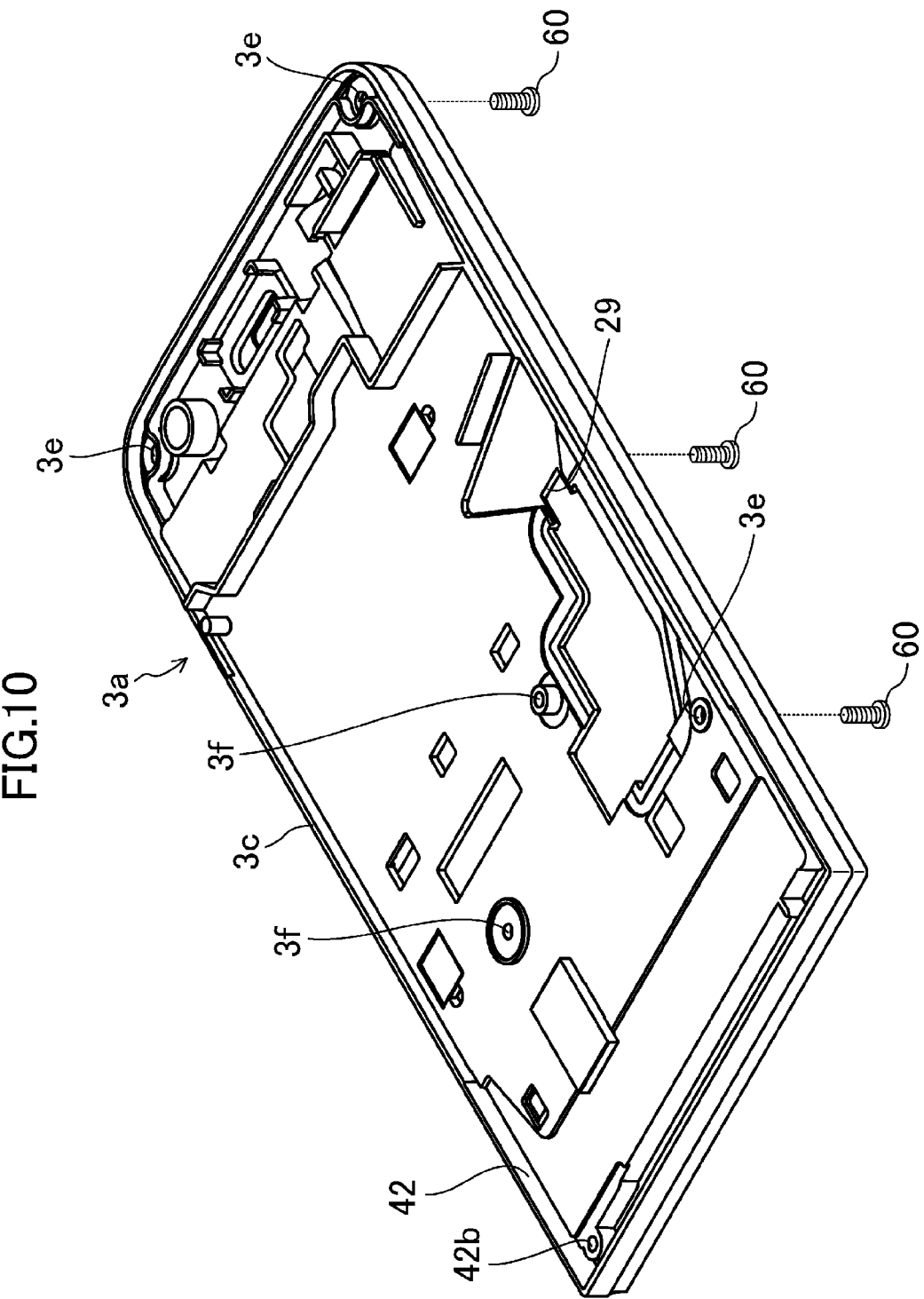
FIG. 10 is a perspective view of a front cabinet from a back side thereof.
Figure 11:
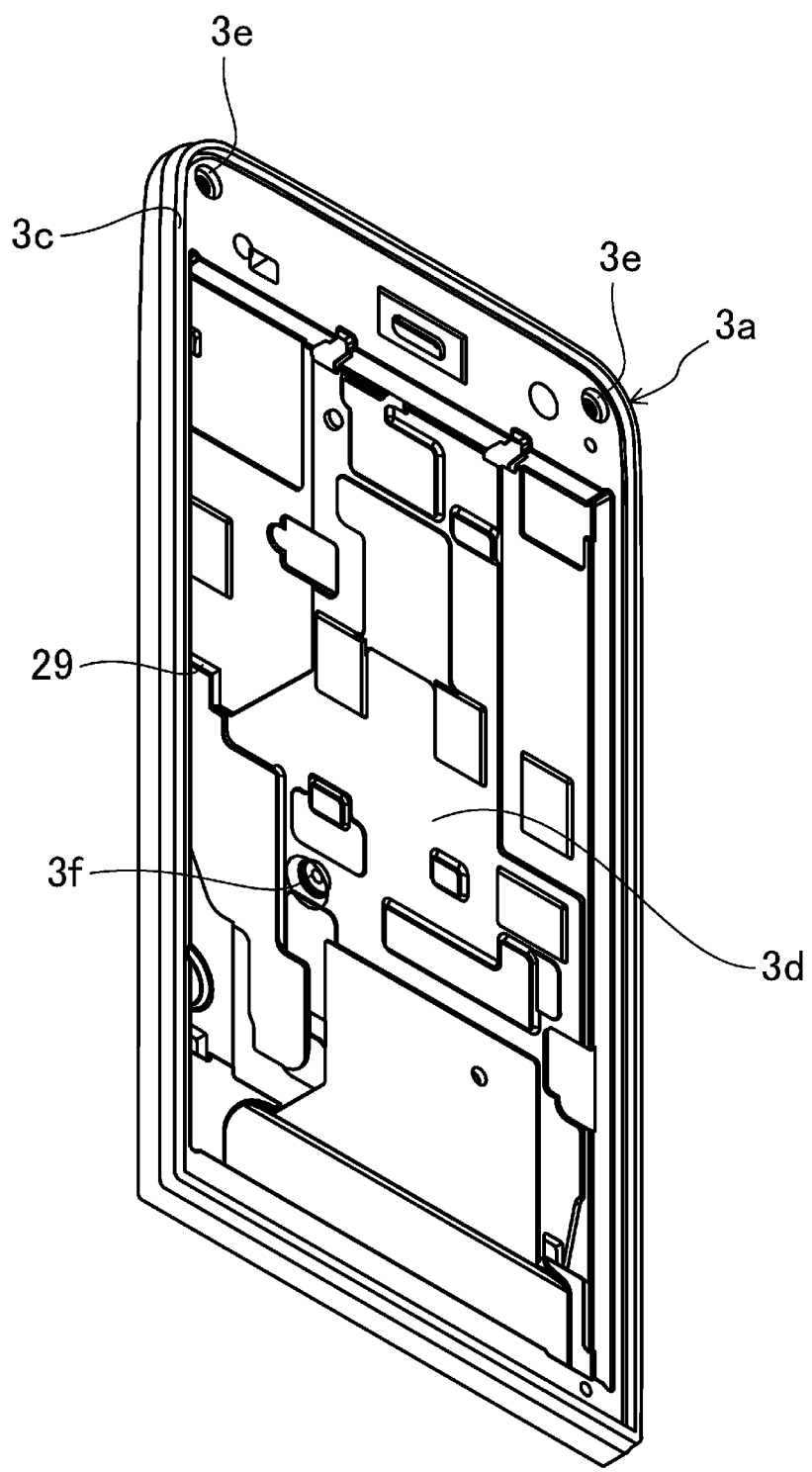
FIG. 11 is a perspective view of the front cabinet from a front side thereof.
Figure 12:
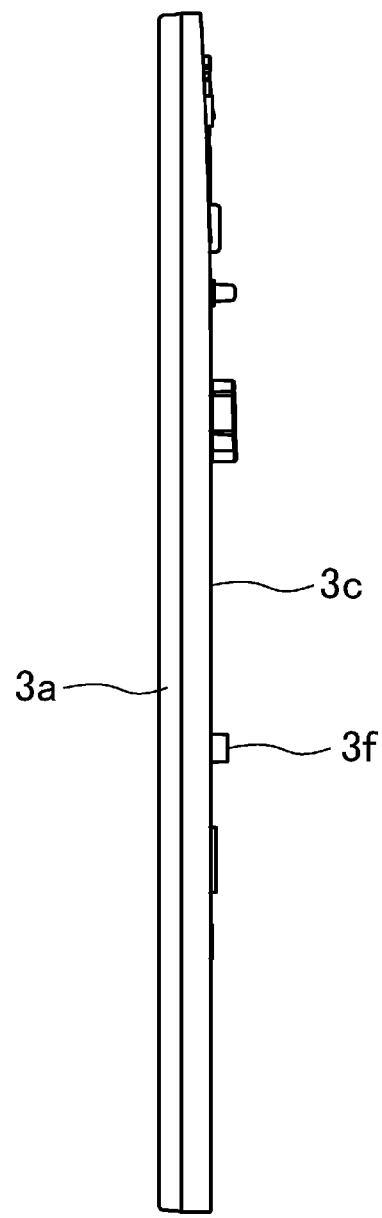
FIG. 12 is a right side view of the front cabinet.

As illustrated in FIG. 9, the rotary housing 3 is formed by connecting a rectangular dish-shaped front cabinet 3a and a rectangular dish-shaped back cabinet 3b together at a partition part 3c parallel to a thickness direction of the rotary housing 3. Each of the front cabinet 3a and the back cabinet 3b may be a molded resin part or a molded metal part. In the present embodiment, the front cabinet 3a is made of a lightweight material having high stiffness, such as a magnesium alloy, as illustrated in FIGS. 10-12. As illustrated in FIG. 11, a display accommodation recess 3d in which the display 2 is accommodated with a display substrate (not shown in the figure) being arranged on a back side of the display 2 is formed on a front side of the front cabinet 3a. On the front side of the front cabinet 3a, the display accommodation recess 3d in which the display 2 is accommodated is covered by a display cover 9 (see, e.g., FIG. 3) formed from an acrylic plate or a glass plate. Through-holes 3e for fastening the front cabinet 3a and the back cabinet 3b together are formed such that two of the through-holes 3e are at an upper end of the front cabinet 3a and the other through-hole 3e is in a lower part of the front cabinet 3a. As illustrated in FIG. 10, in a middle part of the front cabinet 3a in the horizontal direction and the vertical direction, a pair of fixing holes 3f for fixing the rotation support mechanism are formed so as to diagonally oppose each other with a predetermined distance. In the present embodiment, the upper fixing hole 3f is provided with an internal screw threaded boss part, and the lower fixing hole 3f is a through-hole.

Figure 13:
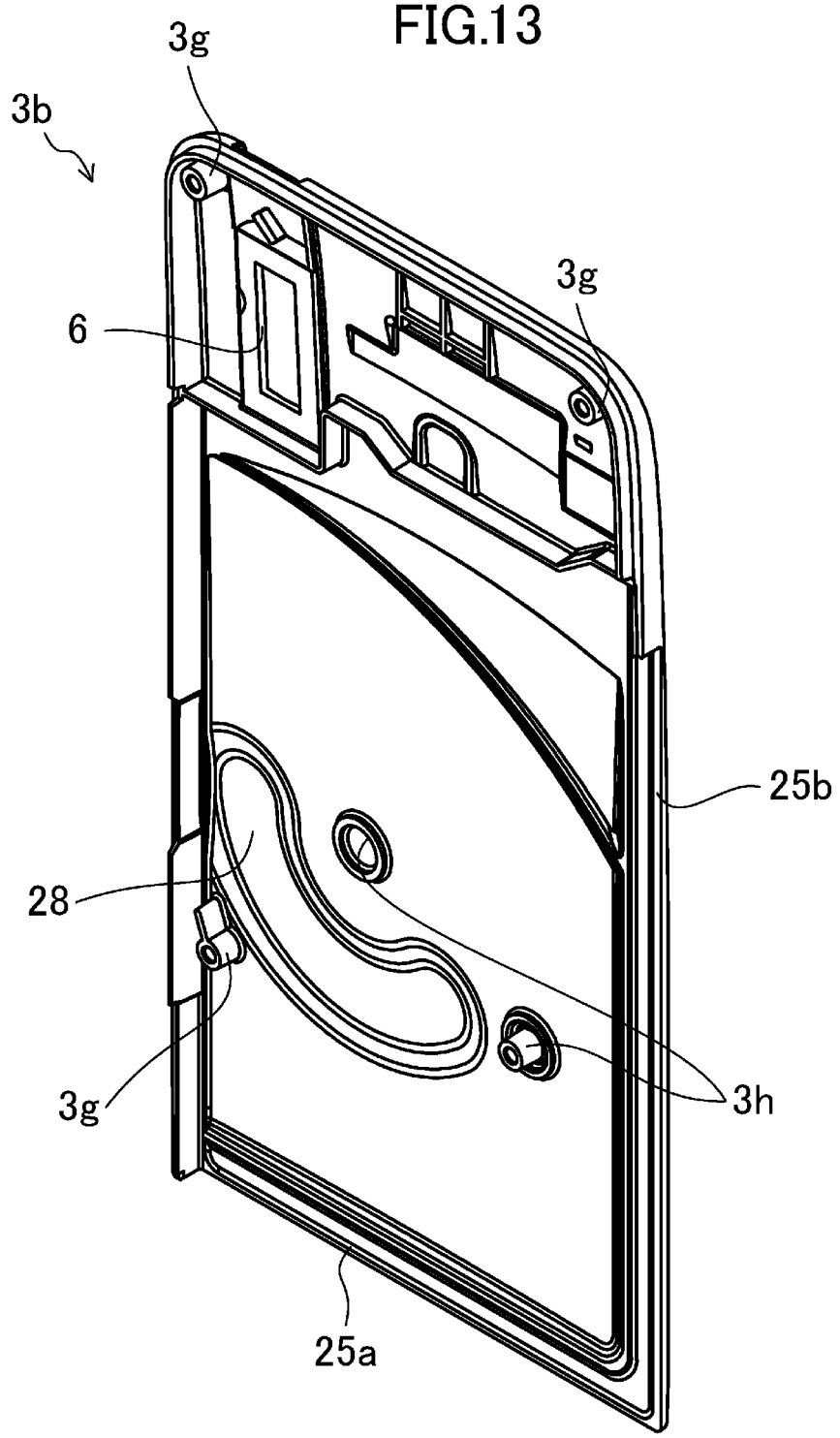
FIG. 13 is a perspective view of a back cabinet from a front side thereof.
Figure 14:
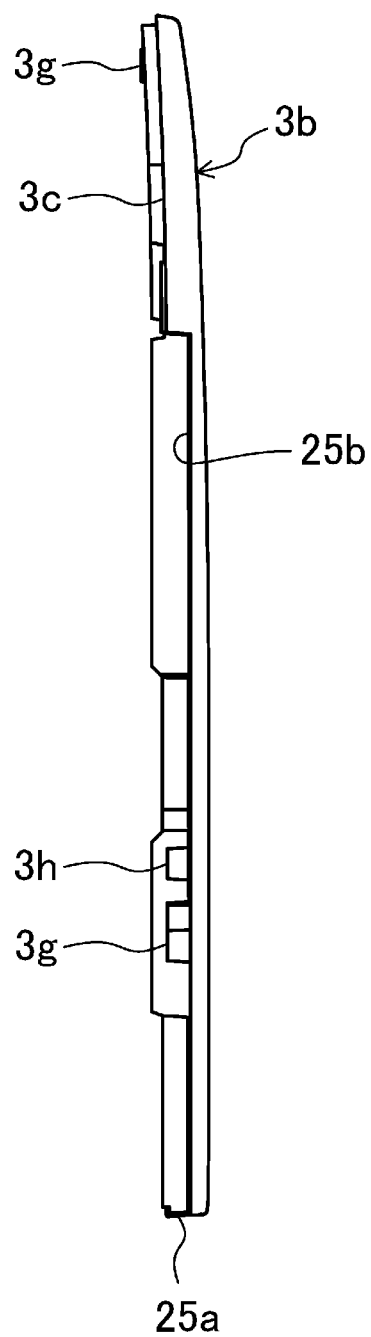
FIG. 14 is a right side view of the back cabinet.

As illustrated in FIGS. 13 and 14, fastening holes 3g for fastening the cabinets together are formed in positions corresponding to the through-holes 3e on a front side of the back cabinet 3b and are each provided with an internal screw threaded boss part. In addition, fixing holes 3h for fixing the rotation support mechanism are formed in positions corresponding to the pair of fixing holes 3f. The lower fixing hole 3h is provided with an internal screw threaded boss part corresponding to the associated one of the fixing holes 3f, and the upper fixing hole 3h is a through-hole corresponding to the associated one of the fixing holes 3f. As illustrated in FIG. 13, a rectangular opening 6 for a back display is formed in an upper part of the back cabinet 3b. In the opening 6, a sub-display 6a (see, e.g., FIG. 15) is arranged to display, e.g., a time.

Figure 4:
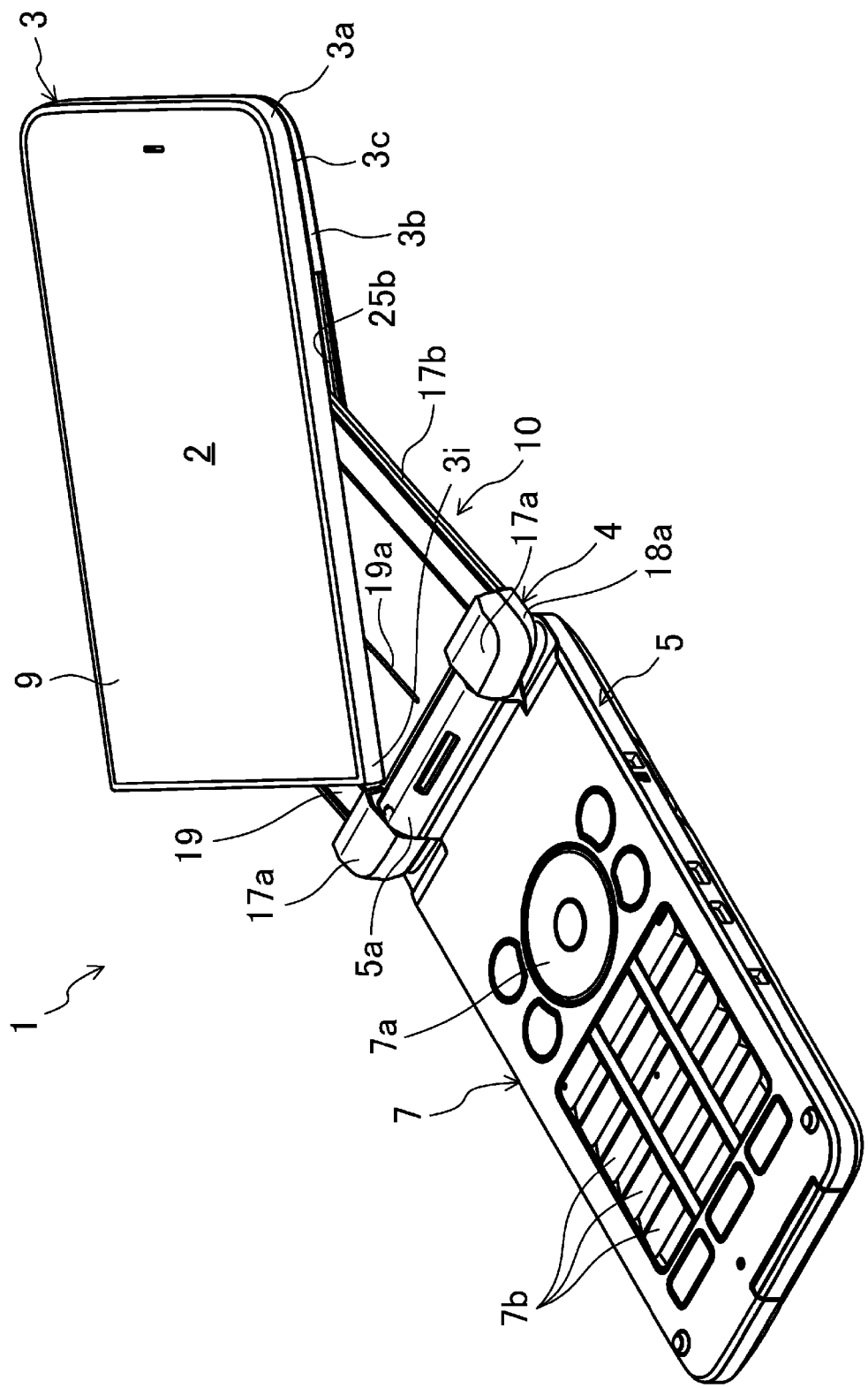
FIG. 4 is a perspective view illustrating the mobile phone from the front side thereof when the rotary housing is being switched to the vertical position or a horizontal position.
Figure 5:
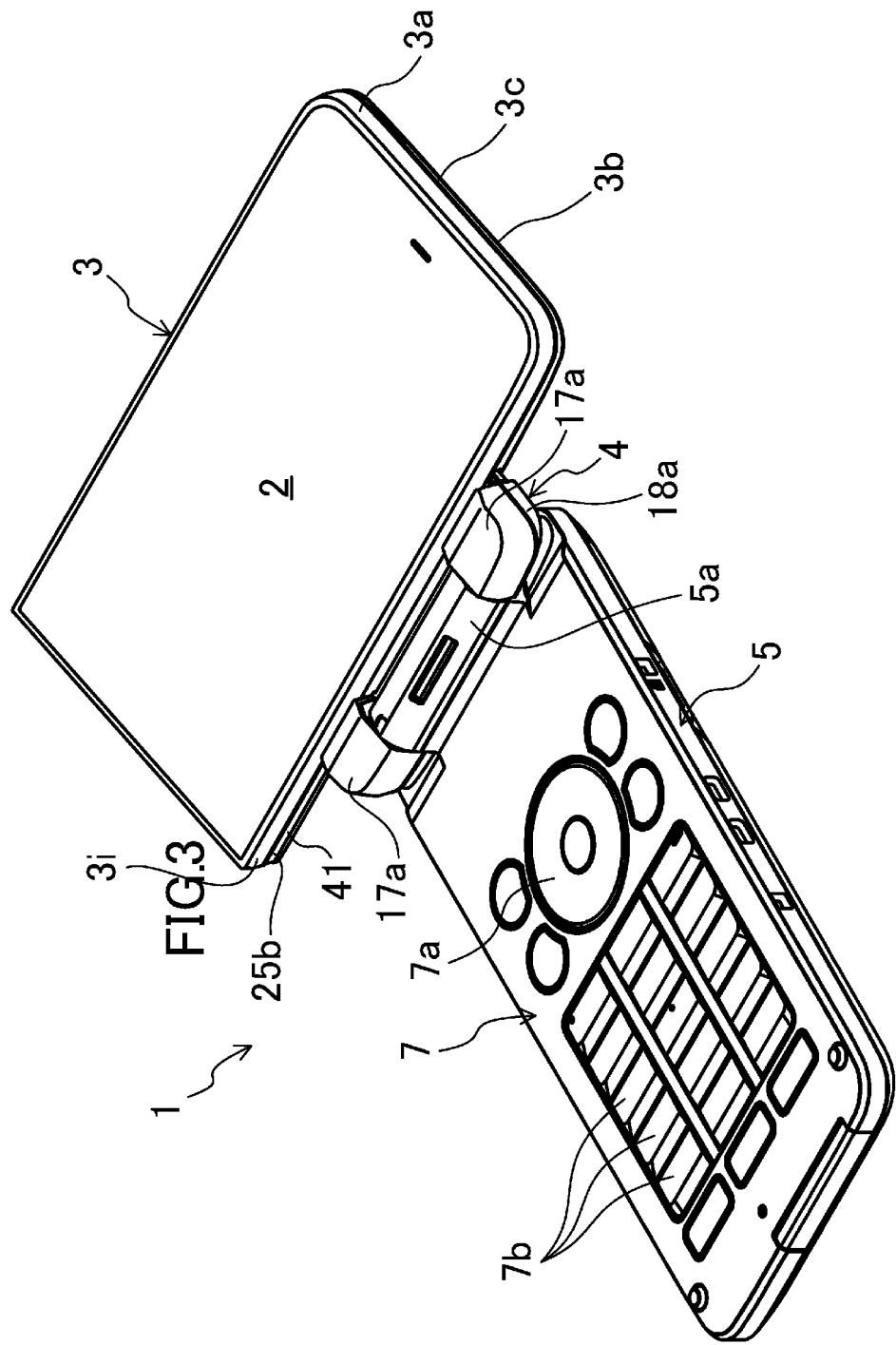
FIG. 5 is a perspective view illustrating the mobile phone from the front side thereof when the rotary housing is in the horizontal position.

A rotation support mechanism 10 rotatably supports the rotary housing 3 such that the rotary housing 3 is, as viewed from the front side of the mobile phone 1, rotated clockwise from a vertical position illustrated in FIG. 3 to a horizontal position illustrated in FIG. 5 or is rotated back from the horizontal position to the vertical position. As illustrated in, e.g., FIG. 4, the rotary housing 3 is configured so as to rotate with a predetermined distance from the hinge part 4 (hinge boss parts 17a and 18a and a protrusion 5a which will be described later). Thus, corners of the rotary housing 3 are not necessarily rounded, and the display 2 is formed so as to have a large area. In addition, as illustrated in FIG. 5, in the state in which the rotary housing 3 is in the horizontal position and the mobile phone 1 opens, the mobile phone 1 can be mounted on a mount surface, e.g., a desk surface, such that the back side of the fixed housing 5 faces the mount surface.

FIGS. 15-20 are perspective views and back views of the rotary housing 3 when the back cabinet 3b is detached. As illustrated in FIGS. 1 and 22-28, the rotation support mechanism 10 includes a guide plate 16 made of, e.g., stainless steel and having a first slide pin 11 which is a first slide member sliding upon rotation of the rotary housing 3, a second slide pin 12 which is a second slide member sliding upon the rotation of the rotary housing 3, and a guide hole 13 for restricting the first slide pin 11 to slide in an arc in the horizontal direction. The first slide pin 11 and the second slide pin 12 are connected to a plate-shaped connection member 21 arranged on a side closer to the back cabinet 3b relative to the guide plate 16 (on a back side thereof) by caulking the first slide pin 11 and the second slide pin 12 at ends thereof.

Figure 22:
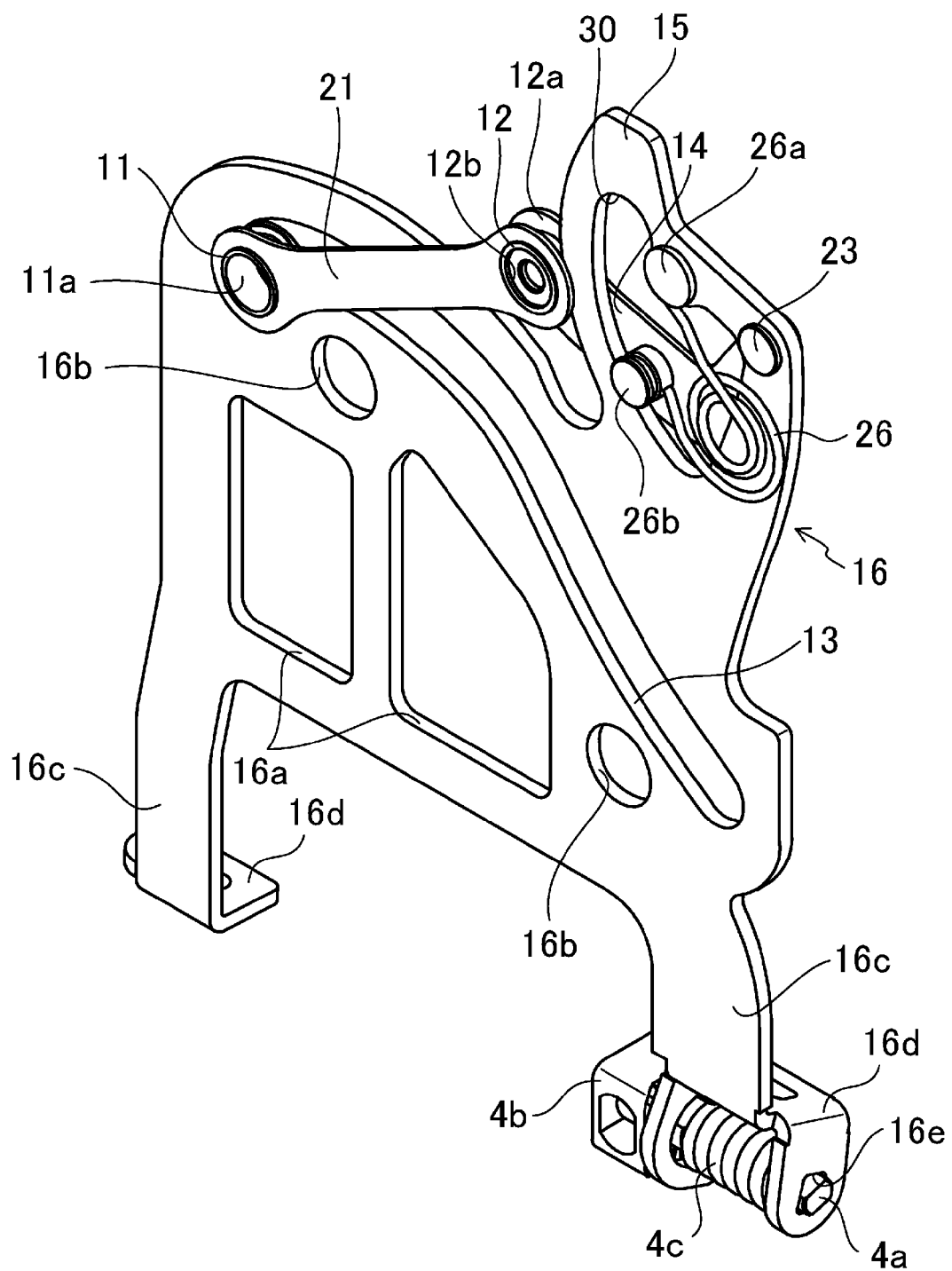
FIG. 22 is a perspective view of the main part of the rotation support mechanism from a back side thereof when the rotary housing is in the vertical position.
Figure 23:
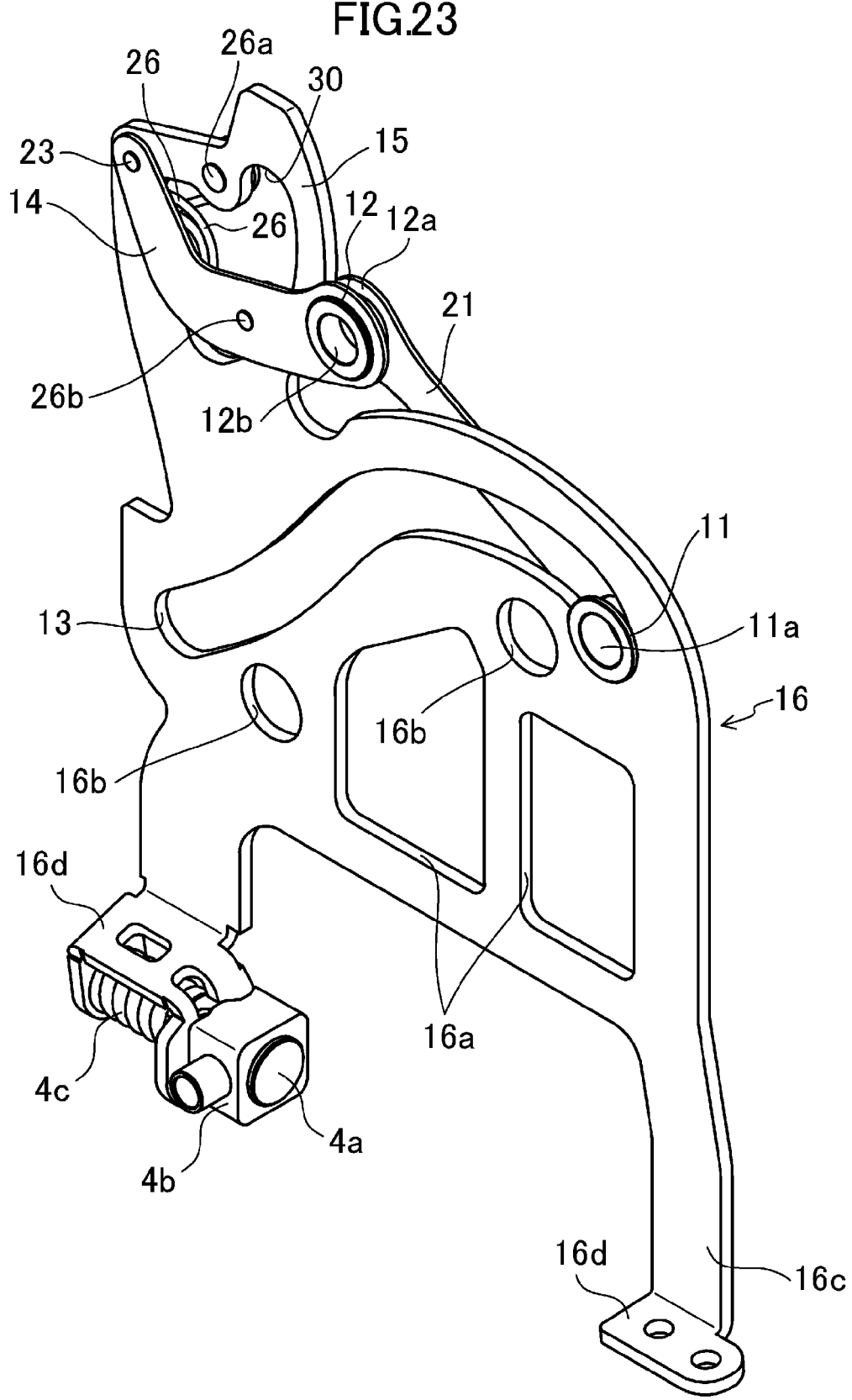
FIG. 23 is a perspective view of the main part of the rotation support mechanism from a front side thereof when the rotary housing is in the vertical position.

As illustrated in, e.g., FIG. 22, a rotary shaft 23 is provided in an upper right end part of the guide plate 16 as viewed from the back side of the guide plate 16. The rotary shaft 23 is rotatably connected to one end of a linking member 14 rotatably connected to the second slide pin 12 at the other end. The linking member 14 is, e.g., a substantially L-shaped plate. A circular recess 12a is formed around the second slide pin 12 between the connection member 21 and the linking member 14.

A rail 15 fitted into the circular recess 12a is formed above the guide hole 13 in the guide plate 16. By fitting the rail 15 into the circular recess 12a, displacement of the second slide pin 12 in a thickness direction of the guide plate 16 is restricted. The linking member 14 is arranged on a side closer to the front cabinet 3a relative to the guide plate 16 (on a front side thereof), and the guide plate 16 is sandwiched between the connection member 21 and the linking member 14. Since each of the guide plate 16, the linking member 14, and the connection member 21 is in a plate shape, the thickness of the rotation support mechanism 10 is limited.

Each of the guide hole 13, the linking member 14, and the rail 15 may be in any shapes, but, e.g., the guide hole 13 may be formed in a convexly curved shape which upwardly protrudes. The rail 15 is formed above the guide hole 13, and vertically extends in a curved line in accordance with a movement pattern of the second slide pin 12.

A torsion coil spring 26 which is an elastic member for assisting in rotating the rotary housing 3 is connected to the linking member 14. Specifically, a circular part of the torsion coil spring 26 at one end thereof is rotatably connected to a first support pin 26a provided at an upper end of the guide plate 16, and a circular part of the torsion coil spring 26 at the other end thereof is rotatably connected to a second support pin 26b provided on a side closer to the guide plate 16 (on the back side thereof) in the linking member 14 in the state in which the torsion coil spring 26 passing through a spring opening 30 formed along the rail 15. The torsion coil spring 26 is attached to the guide plate 16 in the state in which the first slide pin 11 and the second slide pin 12 are connected together through the connection member 21. The torsion coil spring 26 does not directly bias the second slide pin 12 (rotary housing 3) at the end at which the torsion coil spring 26 is connected to the second support pin 26b, but biases the second slide pin 12 through the linking member 14. Thus, the principle of leverage can be used, and it is likely to fulfill the function to assist in the rotation of the rotary housing 3. In addition, since a connection part where the torsion coil spring 26 is connected to the linking member 14 at the end at which the torsion coil spring 26 is connected to the second support pin 26b can be arranged in a dead space of the spring opening 30, the thickness of the rotation support mechanism 10 is limited.

The guide plate 16 is, e.g., a stainless steel plate. The guide hole 13 and the rail 15 are formed in an upper part of the guide plate 16, and a plurality of, e.g., rectangular through-holes 16a are formed below the guide hole 13 and the rail 15 to reduce the weight of the guide plate 16. A pair of spring insertion holes 16b are formed such that one of the spring insertion holes 16b is on a left side in a middle part of the guide plate 16 in the vertical direction and the other spring insertion hole 16b is on a right side in the middle part of the guide plate 16 in the vertical direction. The guide plate 16 includes, at a lower end thereof, a pair of downwardly-extending legs 16c. Each of the pair of legs 16c has an extension 16d bent in the thickness direction of the guide plate 16 (bent toward the front cabinet 3a), and a hinge shaft insertion hole 16e opens in the extension 16d on the left side as viewed from the front side of the guide plate 16. On the other hand, no hole is formed in the extension 16d on the right side.

Figure 21:
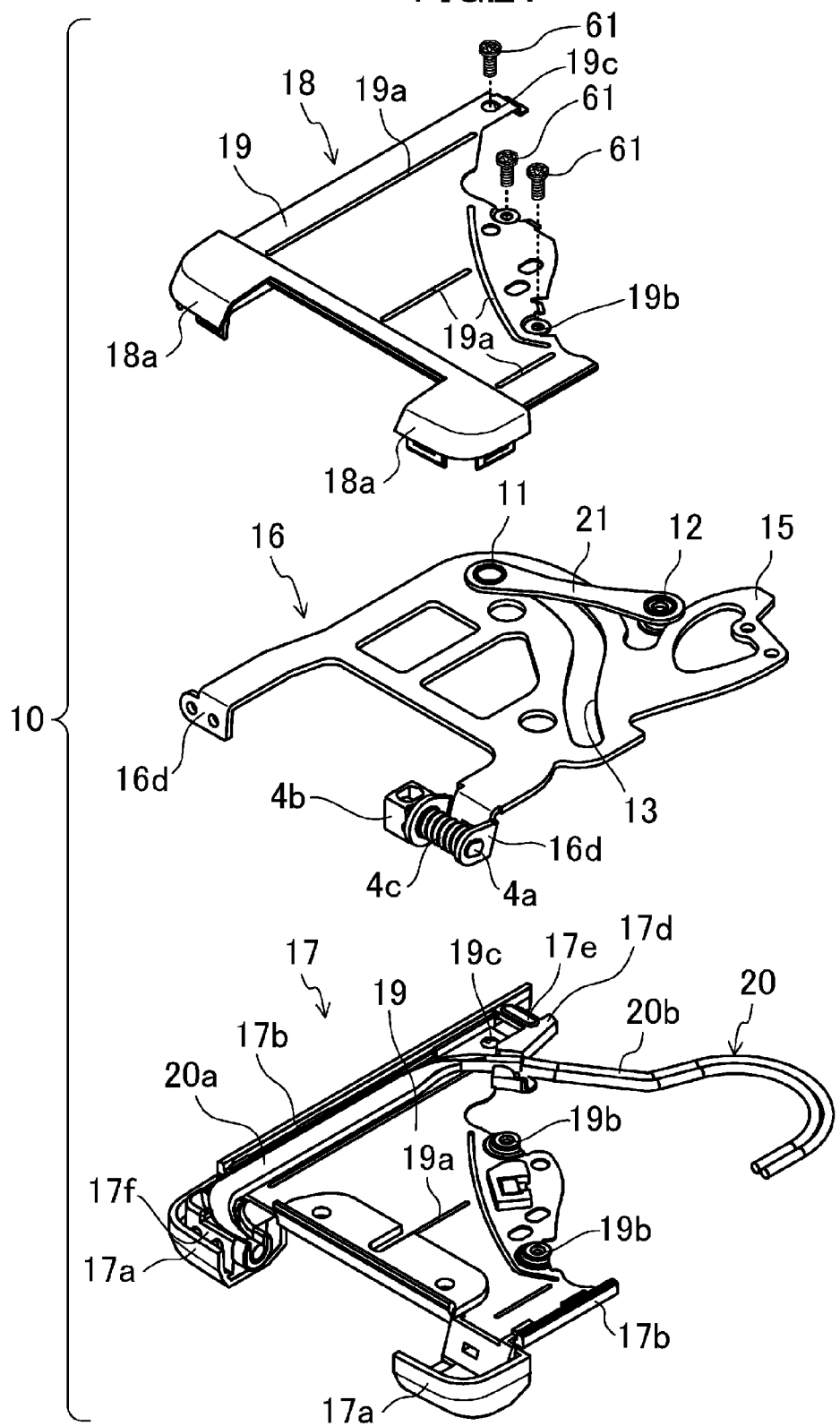
FIG. 21 is an exploded perspective view of the rotation support mechanism.
Figure 29:
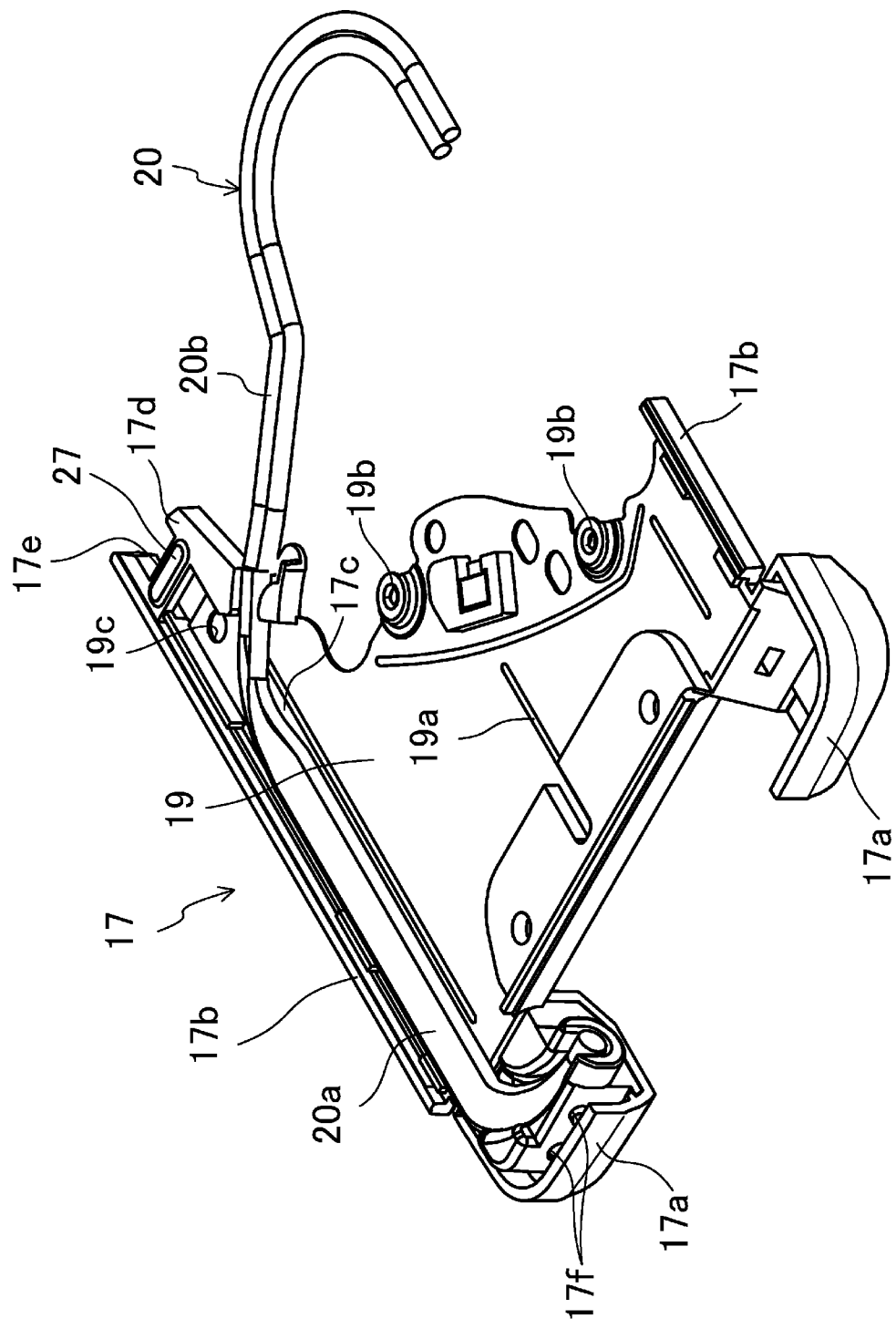
FIG. 29 is a perspective view of a front hinge housing in which a signal line is accommodated from a back side of the front hinge housing.

As illustrated in FIG. 21, the guide plate 16 is sandwiched between a front hinge housing 17 and a back hinge housing 18 which can be disassembled in the thickness direction of the guide plate 16. As illustrated in FIG. 29, the front hinge housing 17 includes the right and left hinge boss parts 17a forming the hinge part 4, and decorative side parts 17b upwardly extending from the hinge boss parts 17a to cover right and left side surfaces of the guide plate 16. Part of the front hinge housing 17 on a front side thereof is covered by a thin decorative plate 19 made of metal. The decorative side part 17b on the left side is longer than that on the right side as viewed from a back side of the front hinge housing 17. The appearance of the mobile phone 1 can be enhanced if the decorative side part 17b is made of the same material as that of the back cabinet 3b and has the same color as that of the back cabinet 3b. The thin decorative plate 19 is, e.g., a thin stainless plate formed by press molding and colored by, e.g., painting. The front hinge housing 17 and the thin decorative plate 19 are integrally molded, e.g., upon resin injection.

As illustrated in FIG. 29, a raised part 27 protruding in the thickness direction of the rotary housing 3 is formed in the decorative side part 17b on the left side as viewed from the back side of the front hinge housing 17. On the other hand, as illustrated in FIG. 13, a substantially fan-shaped slide recess 28 in which the raised part 27 slides upon the rotation of the rotary housing 3 is formed in an inner surface of the back cabinet 3b of the rotary housing 3.

Figure 30:
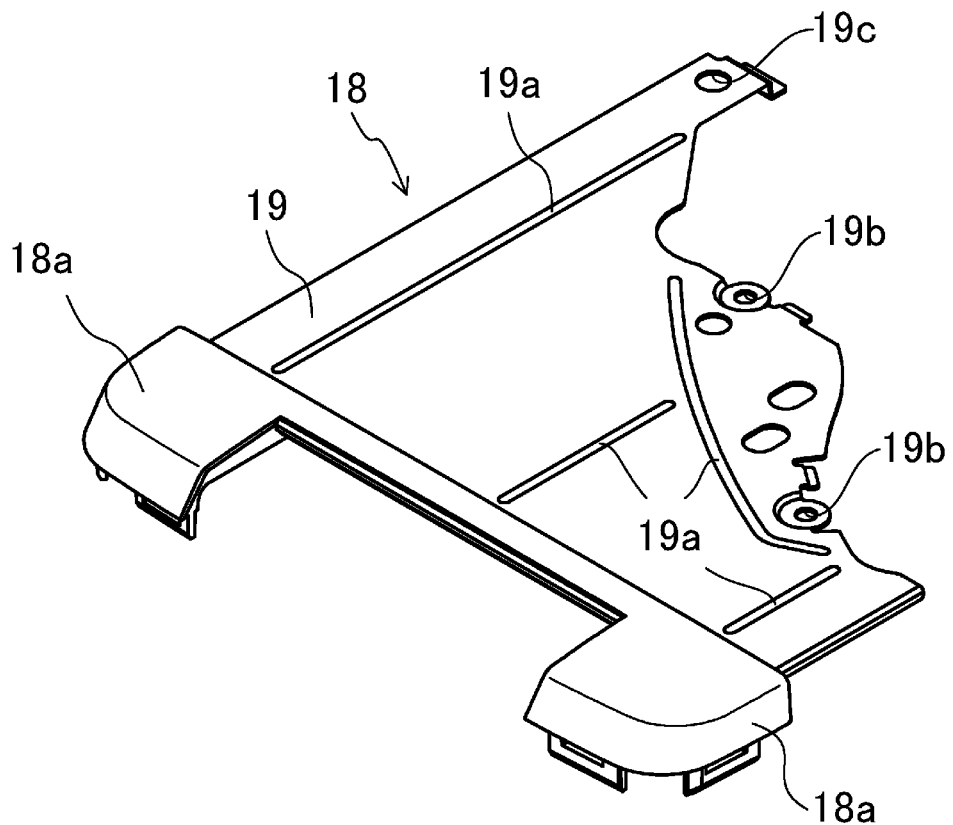
FIG. 30 is a perspective view of a back hinge housing from a back side thereof.

As illustrated in FIG. 30, the back hinge housing 18 includes the right and left hinge boss parts 18a forming the hinge part 4, and part of the back hinge housing 18 on a back side thereof is covered by a thin decorative plate 19 made of metal. The back hinge housing 18 and the thin decorative plate 19 are also integrally formed upon resin injection. A plurality of protrusions 19a each extending vertically or diagonally are formed in each of the pair of front and back thin decorative plates 19 respectively provided for the front hinge housing 17 and the back hinge housing 18, and each of the front hinge housing 17 and the back hinge housing 18 includes screw insertion holes 19b for fixing the guide plate 16. In addition, in each of the front hinge housing 17 and the back hinge housing 18, a screw insertion hole 19c for fixing the thin decorative plates 19 together is formed in an upper left part as viewed from the back side of the back hinge housing 18.

As illustrated in, e.g., FIG. 29, a signal line 20 for electrically connecting the display substrate and the main substrate together passes between the hinge boss parts 17a and 18a on the left side as viewed from the back side of the front hinge housing 17. Although not specifically shown in the figure, the signal line 20 includes, e.g., a pair of thin cables each formed by twisting many thin wires. That is, the signal line 20 includes a wide part 20a which is accommodated in a signal line recess 17c formed at the right of the decorative side part 17b on the left side as viewed from the back side of the front hinge housing 17, and circular parts 20b which extend from the wide part 20a so as to branch into two parts each having a circular cross section and which are bendable in the rotary housing 3 upon the rotation thereof. By covering the wide part 20a of the signal line 20 with the front and back thin decorative plates 19, the signal line 20 is protected from being damaged upon the rotation of the rotary housing 3. As illustrated in, e.g., FIGS. 10 and 15, the signal line 20 is, at a tip end thereof, connected to the display 2 through a signal line insertion member 20c fixed to an upper end of a signal line opening 29 formed in the front cabinet 3a. The signal line insertion member 20c includes a waterproof rubber. It is ensured that the signal line 20 is fixed by the waterproof rubber, and the waterproof rubber prevents water or dust from entering from a side closer to the rotation support mechanism 10 to a side closer to the display 2.

The guide plate 16, the first slide pin 11, the second slide pin 12, the linking member 14, the connection member 21, the front hinge housing 17, the back hinge housing 18, the thin decorative plates 19, the torsion coil spring 26, etc. form the rotation support mechanism 10. Part of the front hinge housing 17 and the back hinge housing 18 which is hidden behind the rotary housing 3 in the vertical position is covered by the thin decorative plates 19. Thus, an increase in thickness of the rotation support mechanism 10 is reduced, and strength and abrasion resistance of the rotation support mechanism 10 are improved. In addition, the appearance of part of the rotation support mechanism 10 exposed during the rotation of the rotary housing 3 is enhanced. Further, since the protrusions 19a minimize a clearance between the thin decorative plate 19 and the rotary housing 3, loosening upon the rotation of the rotary housing 3 is prevented.

Figure 1:
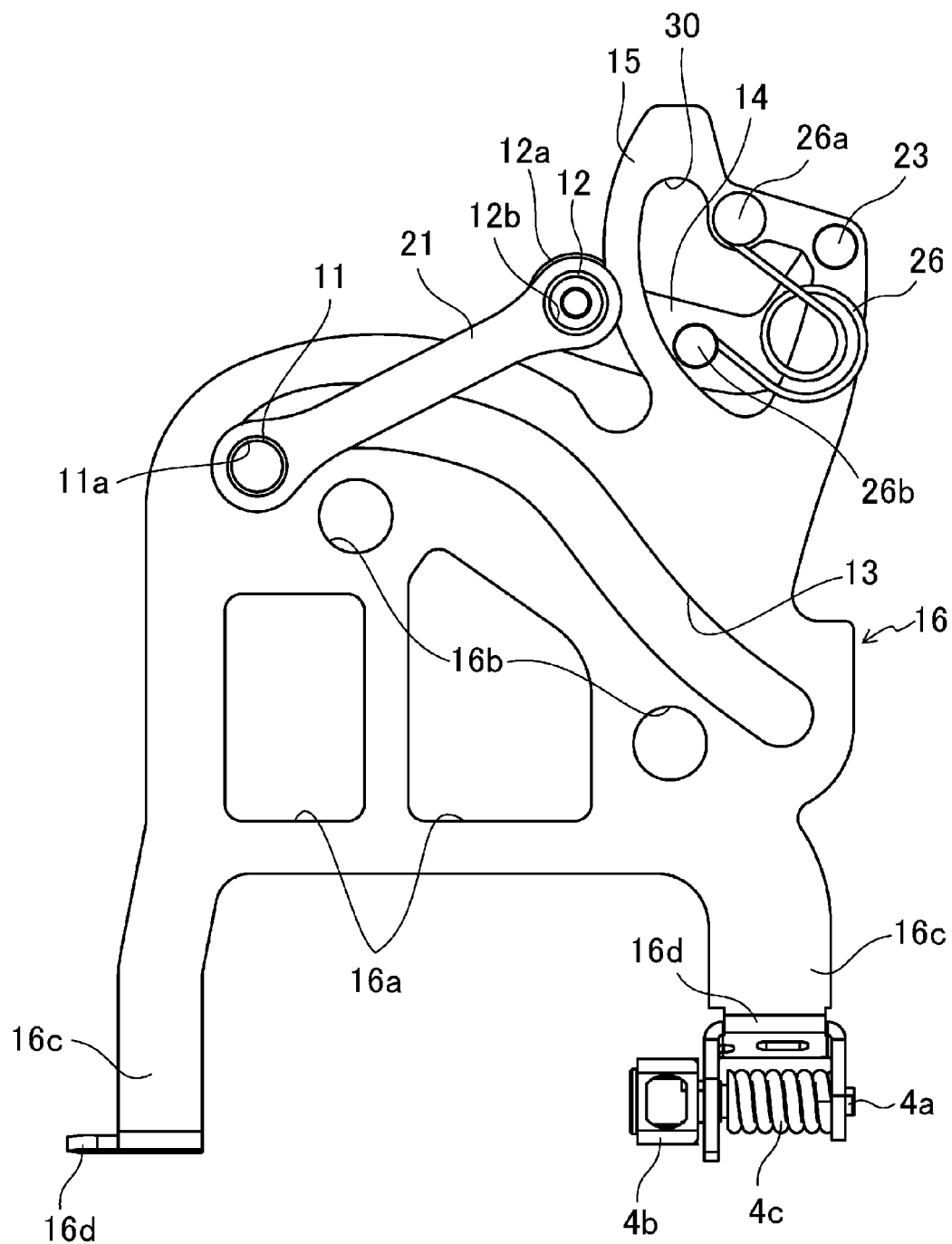
FIG. 1 is a back view illustrating a main part of a rotation support mechanism when a rotary housing of an embodiment of the present invention is in a vertical position.

As illustrated in, e.g., FIG. 1, the first slide pin 11 and the second slide pin 12 respectively include, at the centers thereof, boss threaded holes 11a and 12b into each of which the internal screw threaded boss part of the fixing hole 3f of the front cabinet 3a or the internal screw threaded boss part of the fixing hole 3h of the back cabinet 3b is inserted. The first slide pin 11, the second slide pin 12, and the guide plate 16 are assembled into a unit. Then, as illustrated in, e.g., FIGS. 9 and 18, the internal screw threaded boss part of the fixing hole 3f or the internal screw threaded boss part of the fixing hole 3h is inserted into each of the boss threaded holes 11a and the 12b, and a fastening member 63 is fastened into the fixing hole 3f or the fixing hole 3h. In such a manner, the rotation support mechanism 10 is attached to the front cabinet 3a. If, as illustrated in FIGS. 9 and 21, the rotation support mechanism 10 is assembled as a unit in advance by connecting the first slide pin 11 and the second slide pin 12 to the connection member 21 and respectively engaging the first slide pin 11 and the second slide pin 12 with the guide hole 13 and the rail 15, the rotation support mechanism 10 is connected to the front cabinet 3a of the rotary housing 3 together with the connection member 21 in an assembly line. Thus, assembly of the rotary housing 3 is significantly facilitated.

Figure 8:
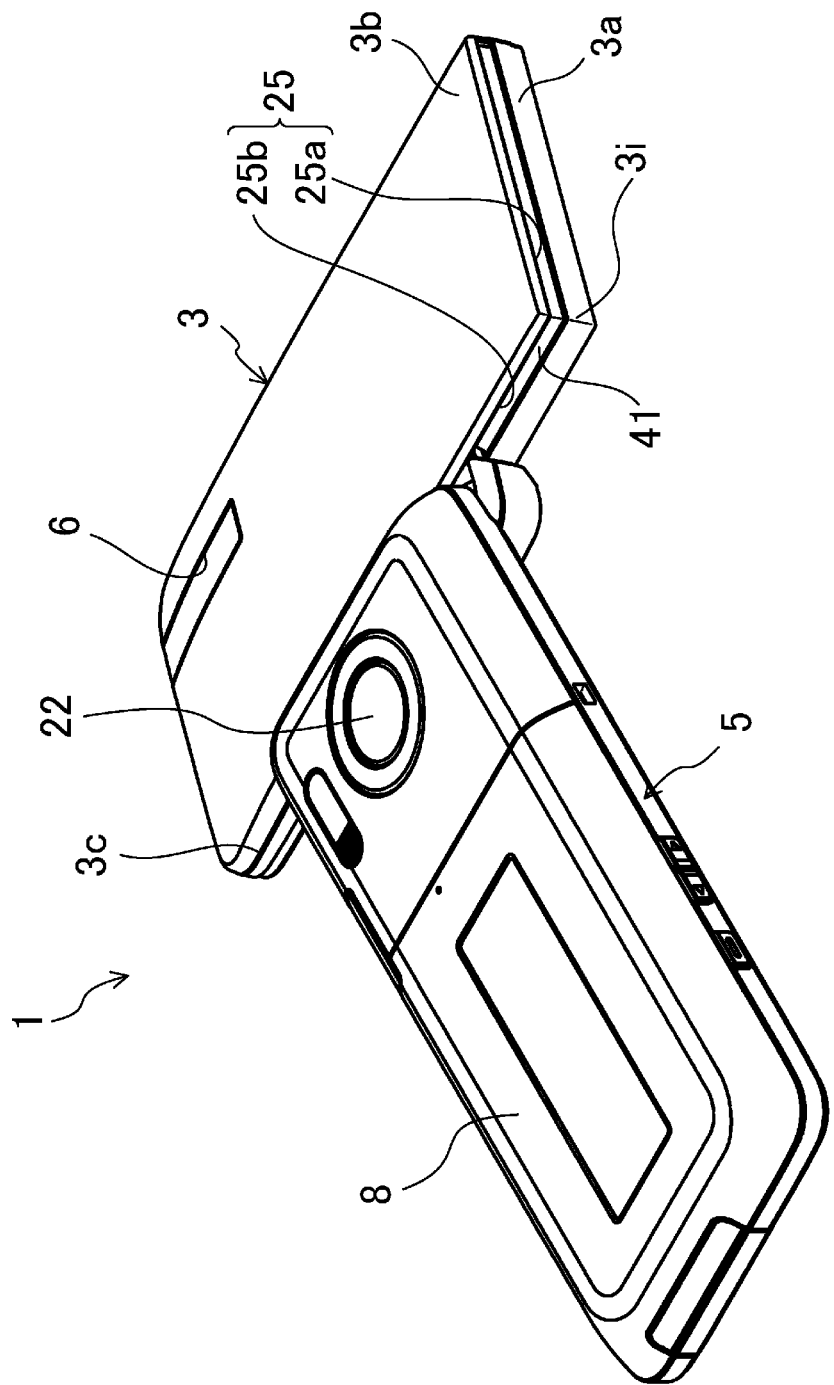
FIG. 8 is a perspective view illustrating the mobile phone from the back side thereof when the rotary housing is in the horizontal position.

As illustrated in, e.g., FIG. 8, a movement opening 25 in which the rotation support mechanism 10 is allowed to move is formed in a middle part of a side surface of the rotary housing 3 in the thickness direction thereof. The movement opening 25 is formed at the edge of the partition part 3c of the back cabinet 3b. The movement opening 25 is formed in an L-shape extending from a lower opening 25a positioned on a lower side of the back cabinet 3b in the vertical position to a side opening 25b positioned on a left side of the back cabinet 3b in the vertical position as viewed from a back side of the mobile phone 1. As illustrated in FIG. 9, the back cabinet 3b is attached to the front cabinet 3a to which the rotation support mechanism 10 is attached, such that the rotation support mechanism 10 is positioned corresponding to the movement opening 25. Then, screws 60 for fastening the cabinets are fastened into the fastening holes 3g with the screws 60 being inserted into the through-holes 3e. In such a manner, the assembly of the rotary housing 3 is performed.

Since the display and the display substrate are attached to the front cabinet 3a, a certain thickness is required for the front cabinet 3a. Thus, as illustrated in FIGS. 13 and 14, the movement opening 25 is formed at the edge of the partition part 3c of the back cabinet 3b for which a great thickness is not required. As a result, the rotation support mechanism 10 can be sandwiched between the front cabinet 3a and the back cabinet 3b without increasing the thickness of the rotary housing 3.

As illustrated in, e.g., FIG. 3, the hinge part 4 includes the right and left hinge boss parts 17a and 18a, and the protrusion 5a formed at an upper end of the fixed housing 5 and sandwiched between pairs of the hinge boss parts 17a and 18a. As illustrated in, e.g., FIG. 21, the extensions 16d of the guide plate 16 are arranged in the pairs of the hinge boss parts 17a and 18a, respectively. A hinge shaft 4a made of metal is attached to the hinge shaft insertion hole 16e of the extension 16d on the right side as viewed from the back side of the rotation support mechanism 10 by, e.g., caulking. The hinge shaft 4a is also unrotatably fixed to the guide plate 16 made of metal. A rectangular cylindrical fixed part 4b is rotatably provided at an inner end of the hinge shaft 4a in the horizontal direction. The rectangular cylindrical fixed part 4b is fixed to the protrusion 5a of the fixed housing 5, and the extension 16d on the left side as viewed from the back side of the guide plate 16 is screwed with a fixing member 17f provided in the hinge boss part 17a. Thus, it is ensured that the rotation support mechanism 10 is fixed to the fixed housing 5 through the hinge part 4.

As illustrated in, e.g., FIG. 22, the hinge shaft 4a includes a biasing mechanism 4c for assisting in folding the rotary housing 3 and the fixed housing 5 against each other. As illustrated in, e.g., FIG. 28, the biasing mechanism 4c includes, e.g., a torsion coil spring for which a direction in which a coiled part is wounded is coincident with an axial direction of the hinge shaft 4a. The torsion coil spring is fixed to the hinge shaft 4a at one end, and is fixed to the fixed part 4b at the other end. By biasing force of the torsion coil spring, the rotary housing 3 is biased against the fixed housing 5 so as to be held in a fully-open position of, e.g., about 165°. As described above, the hinge shaft 4a is directly engaged with the guide plate 16 which is a stiff member, thereby obtaining the high stiffness hinge part 4 which can prevent loosening between the hinge shaft 4a and the guide plate 16 with the reduced number of components.

As illustrated in FIGS. 2 and 8, the movement opening 25 is covered by the decorative side part 17b of the rotation support mechanism 10 and a side closing member 40 and a lower closing member 41 each opening/closing in association with movement of the rotation support mechanism 10 upon the rotation of the rotary housing 3.

Figure 15:
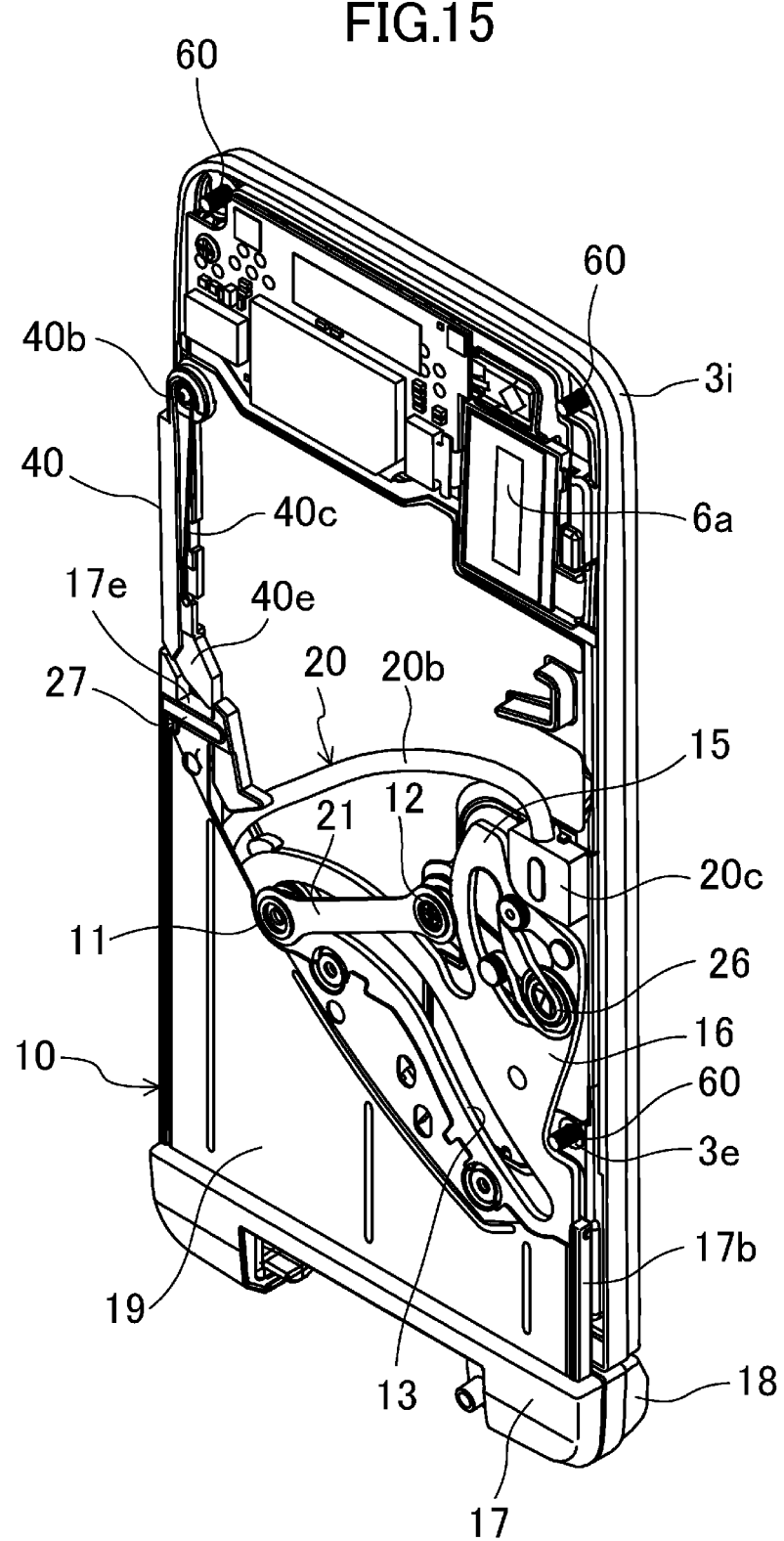
FIG. 15 is a perspective view illustrating the rotation support mechanism and the rotary housing when the back cabinet is detached and the rotary housing is in the vertical position.
Figure 18:
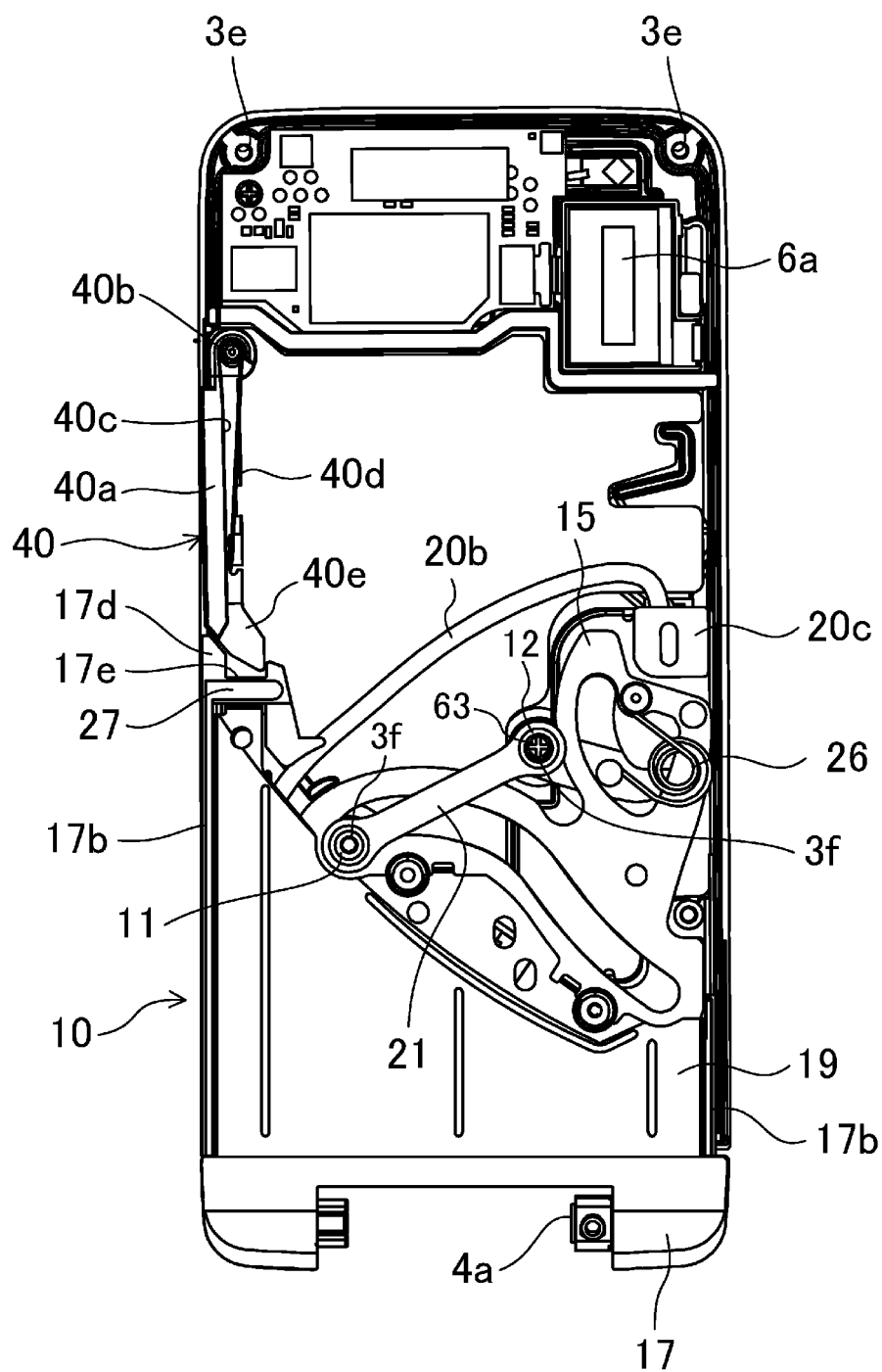
FIG. 18 is a back view illustrating the rotation support mechanism and the rotary housing when the back cabinet is detached and the rotary housing is in the vertical position.
Figure 31:
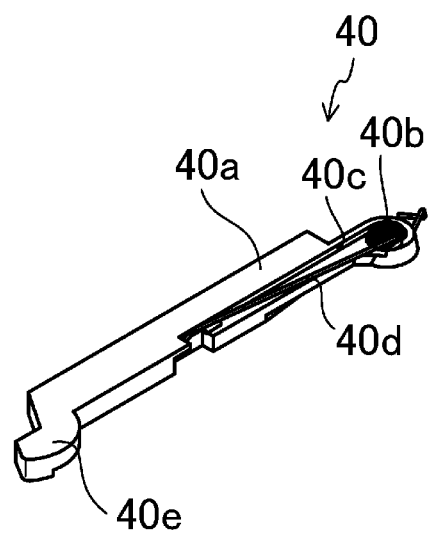
FIG. 31 is an enlarged perspective view illustrating a side closing member.
Figure 32:
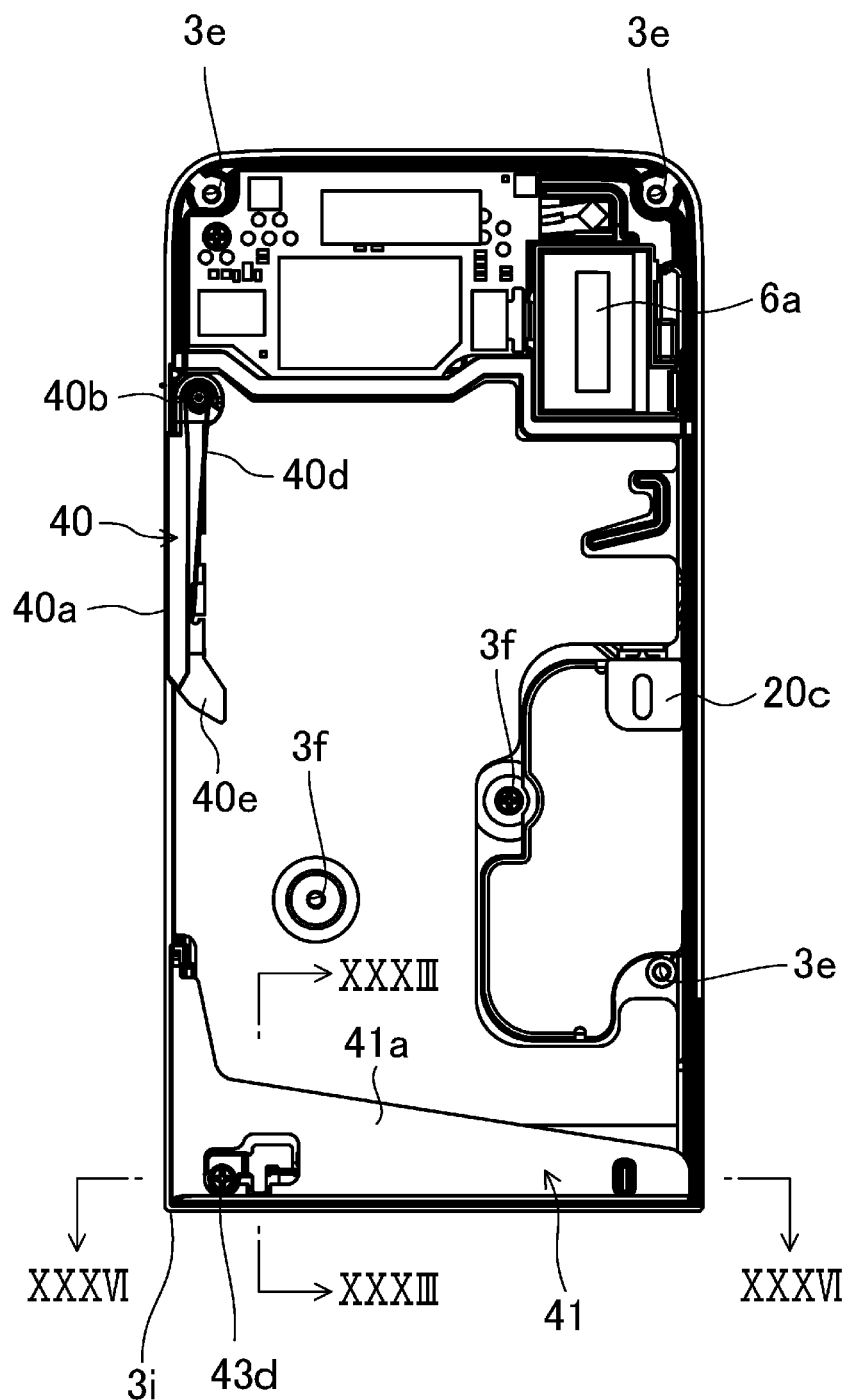
FIG. 32 is a back view of the front cabinet to which a lower closing member body is temporarily fixed.

As illustrated in FIG. 31, the side closing member 40 includes a side closing member body 40a closing the side opening 25b together with the decorative side part 17b, and is pivotably supported about a pivot point 40b. A spring accommodation part 40c is formed in the side closing member body 40a. A torsion coil spring 40d for closing the movement opening 25 is accommodated in the spring accommodation part 40c. By the torsion coil spring 40d, the side closing member body 40a is biased in a direction in which the side opening 25b is closed. As illustrated in FIGS. 15 and 18, a rotation end 40e of the side closing member body 40a is accommodated in a recess 17e of an upper end part 17d of the front hinge housing 17. The appearance of the mobile phone 1 can be enhanced if the side closing member body 40a is made of the same material as that of the back cabinet 3b and has the same color as that of the back cabinet 3b.

Figure 33:
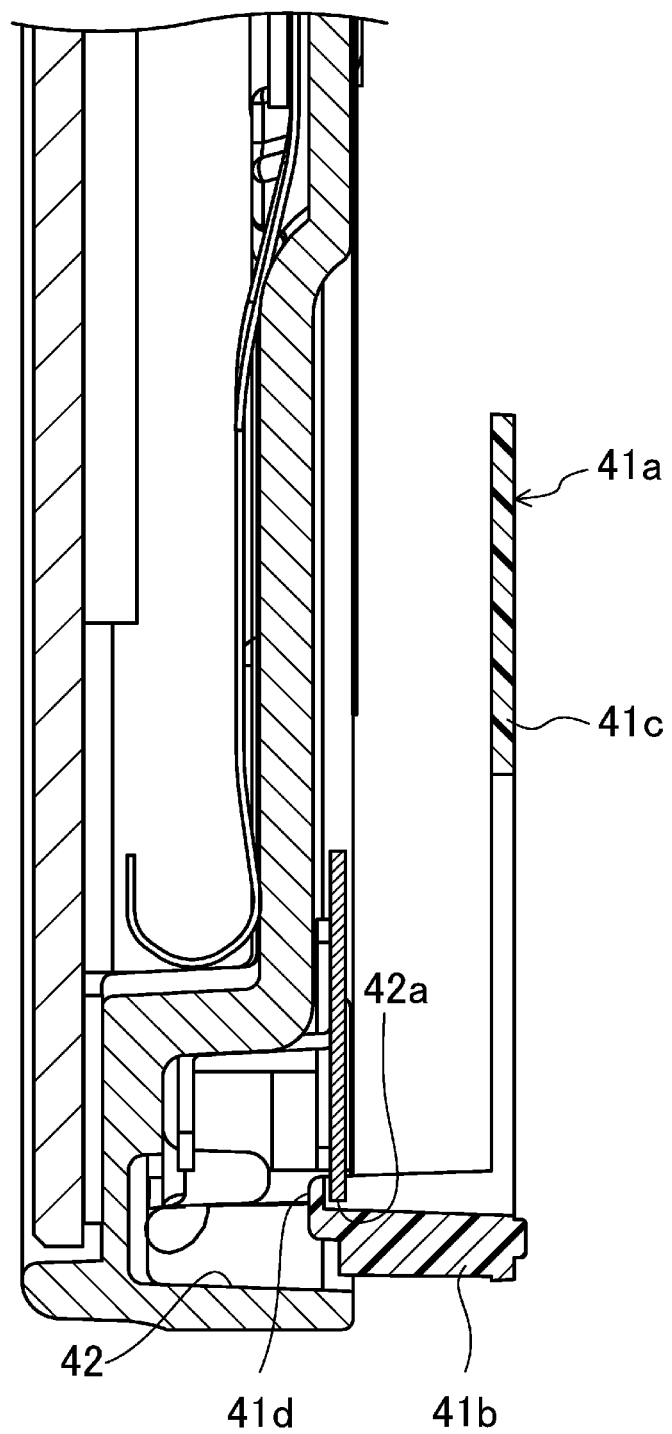
FIG. 33 is a cross-sectional view along an XXXIII-XXXIII line of FIG. 32.
Figure 34:
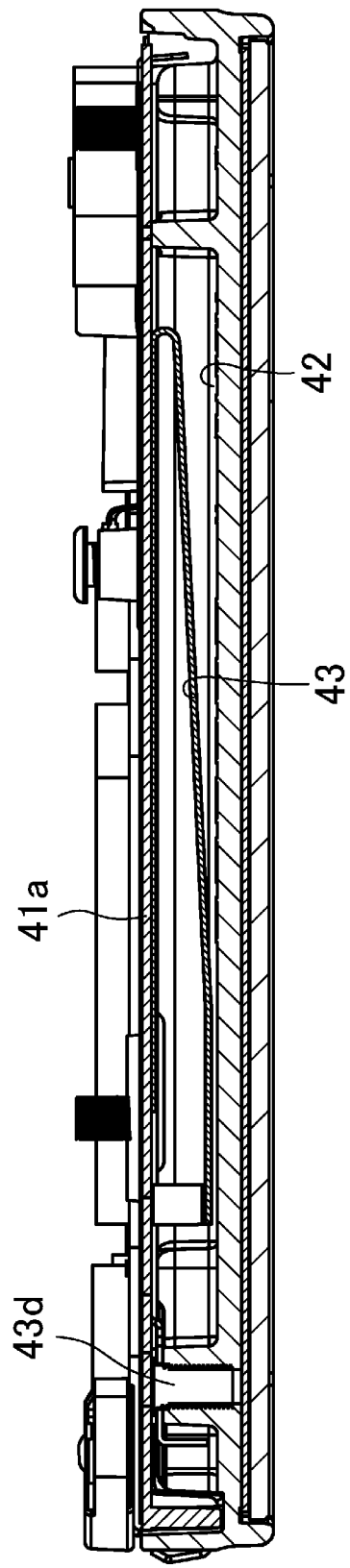
FIG. 34 is a cross-sectional view along an XXXIV-XXXIV line of FIG. 32.
Figure 35:
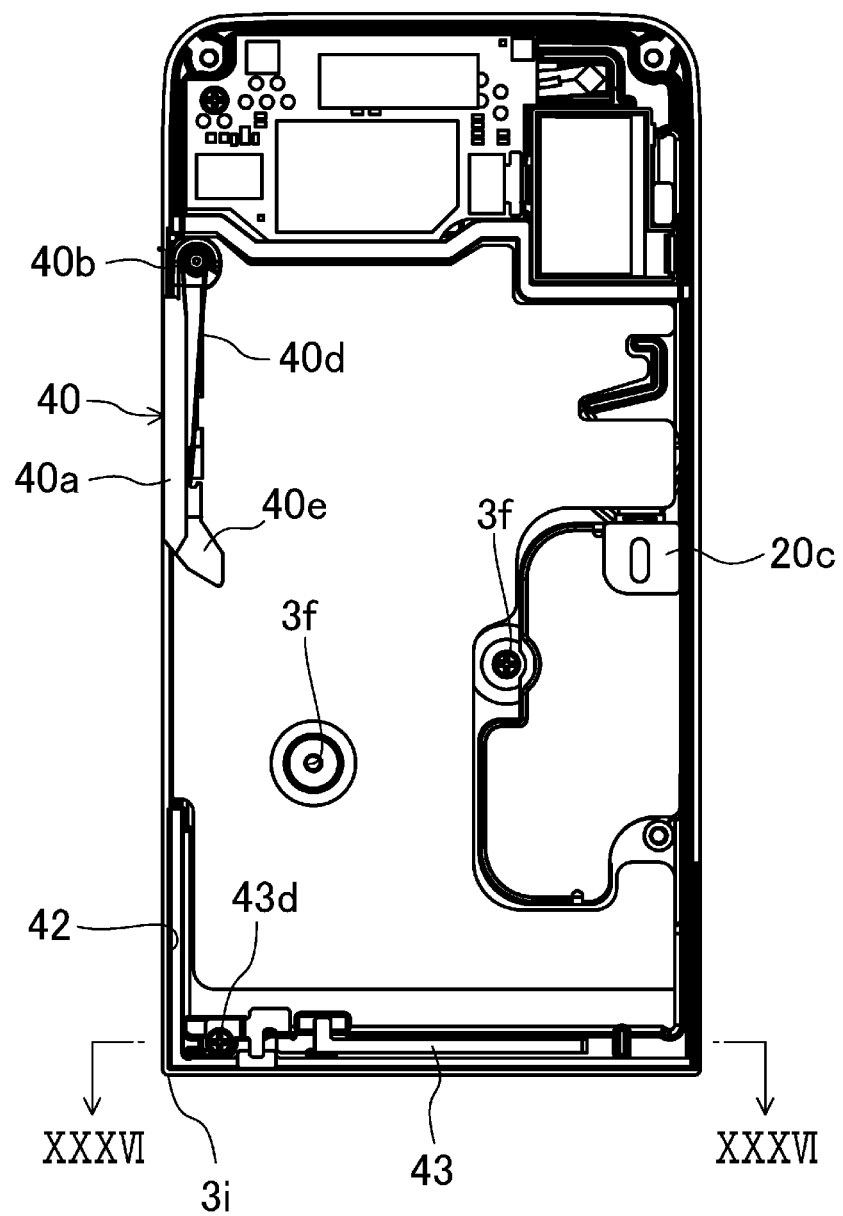
FIG. 35 is a back view of the front cabinet when the lower closing member body is detached and a plate spring is exposed.
Figure 36:
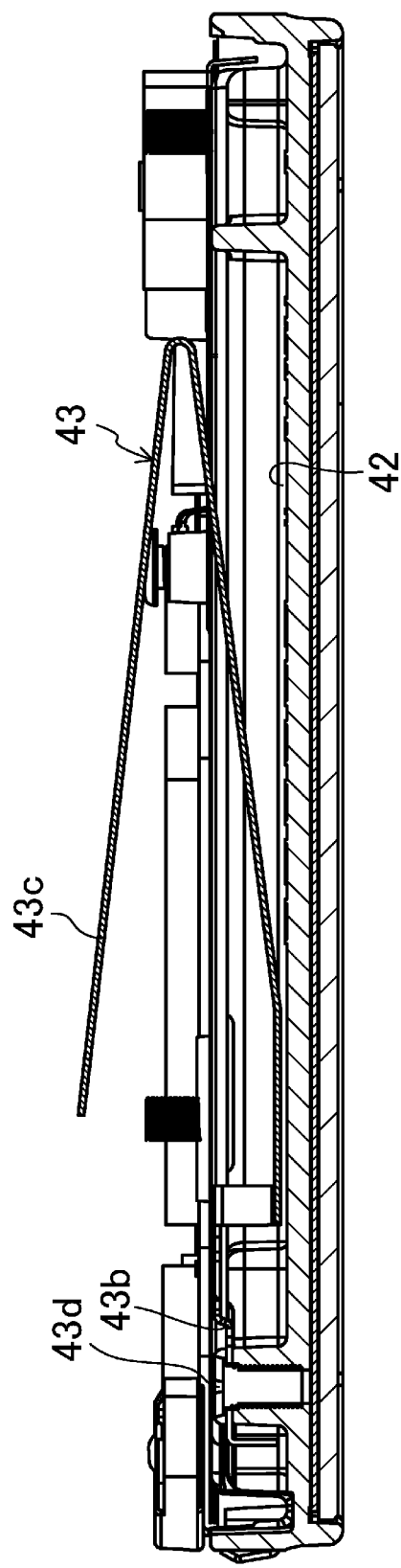
FIG. 36 is a cross-sectional view along an XXXVI-XXXVI line of FIG. 35.
Figure 37:
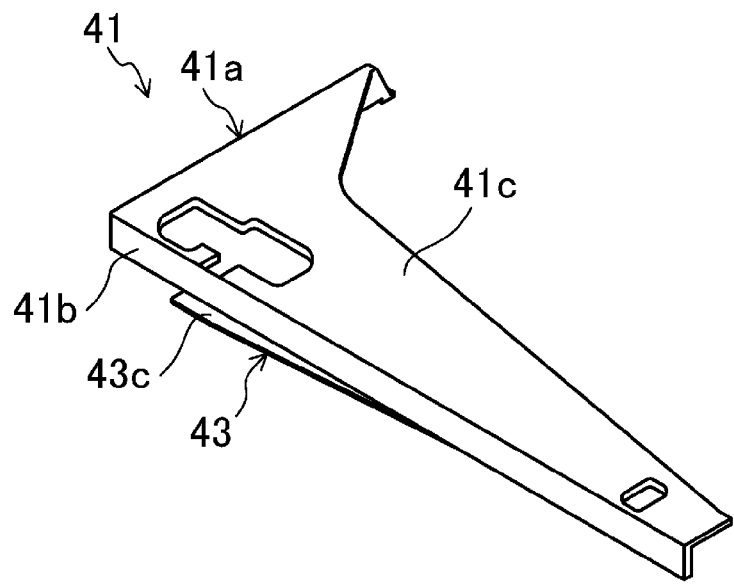
FIG. 37 is an enlarged perspective view illustrating a lower closing member.
Figure 38:
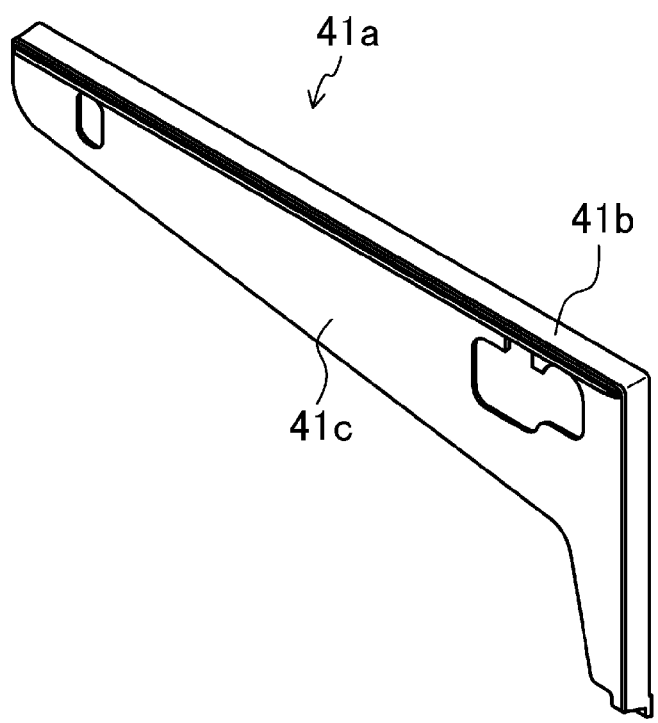
FIG. 38 is an enlarged perspective view illustrating the lower closing member body.
Figure 39:
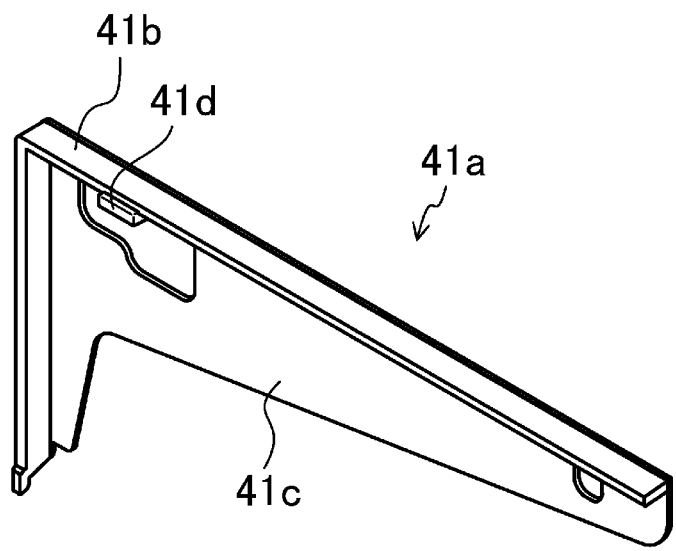
FIG. 39 is an enlarged perspective view illustrating the lower closing member body in another direction.
Figure 40:
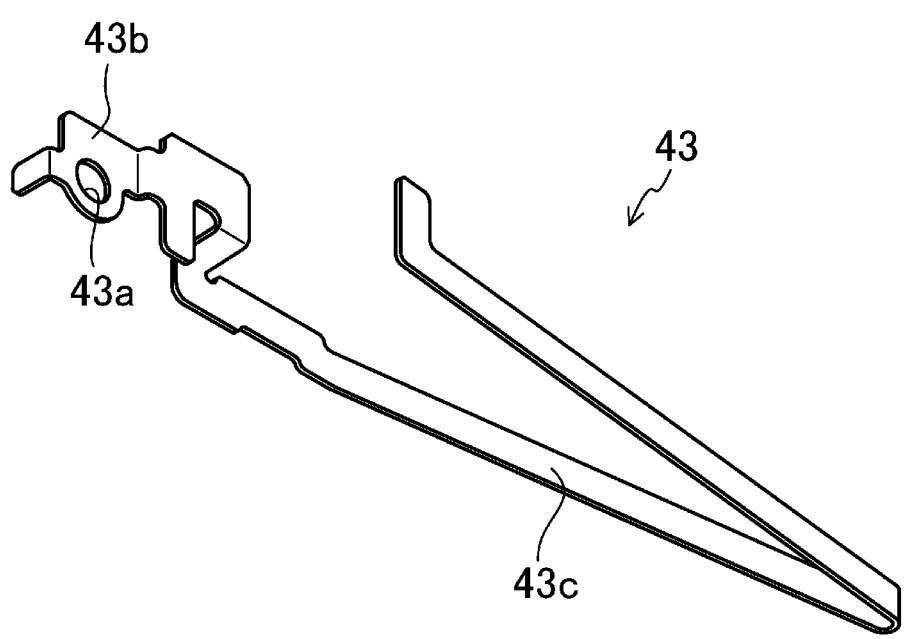
FIG. 40 is an enlarged perspective view illustrating the plate spring.
Figure 41:
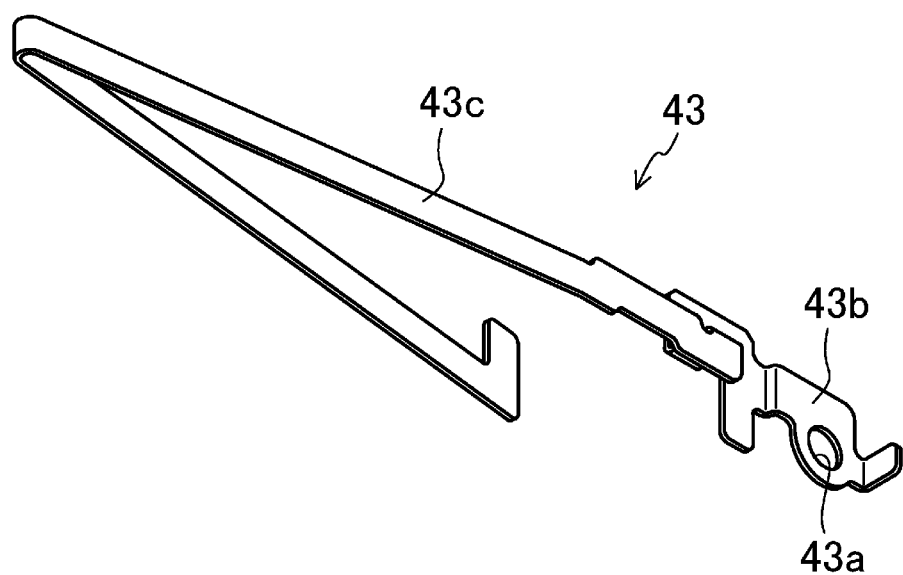
FIG. 41 is an enlarged perspective view illustrating the plate spring in another direction.
Figure 42:
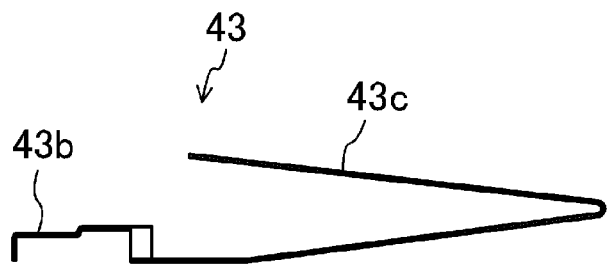
FIG. 42 is an enlarged bottom view illustrating a released state of the plate spring.
Figure 43:
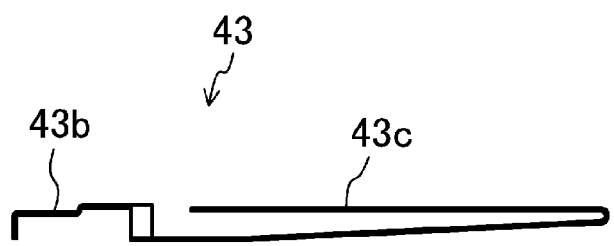
FIG. 43 is an enlarged bottom view illustrating a compressed state of the plate spring.
Figure 44:
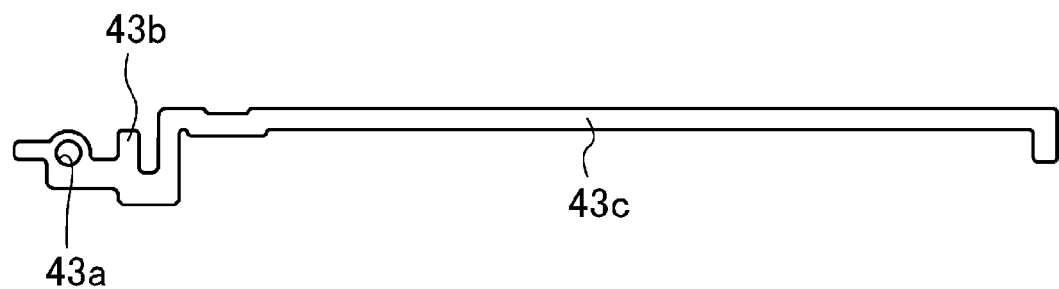
FIG. 44 is an enlarged front view illustrating an exploded view of the plate spring.

As illustrated in FIGS. 32-44, the lower closing member 41 includes a lower closing member body 41a arranged at a lower corner 3i of the rotary housing 3, and a plate spring 43 for biasing the lower closing member body 41a in a direction in which the movement opening 25 is closed. Specifically, the lower closing member body 41a smoothly slides on, e.g., metal, and is a resin molded component made of, e.g., nylon resin having excellent abrasion resistance. The lower closing member body 41a includes an L-shaped part 41b extending along the lower corner 3i, and a cover 41c covering part of the L-shaped part 41b on the front side of the front cabinet 3a. The L-shaped part 41b is accommodated in a closing member accommodation part 42 illustrated in, e.g., FIGS. 10 and 33. As illustrated in FIGS. 33 and 39, a retaining part 41d temporarily engaged with an engagement part 42a of the closing member accommodation part 42 so that the lower closing member body 41a is not detached upon assembly is formed on a back side of the L-shaped part 41b.

As illustrated in FIGS. 40-44, the plate spring 43 is formed by bending spring steel. The plate spring 43 includes an attachment part 43b having a screw hole 43a, and a spring part 43c which is in a V-shape as viewed from the side. The plate spring 43 is configured such that, in the state in which a screw 43d inserted into the screw hole 43a is fastened into a screw hole 42b (see FIG. 10) of the closing member accommodation part 42, the spring part 43c is accommodated in the closing member accommodation part 42.

Figure 7:
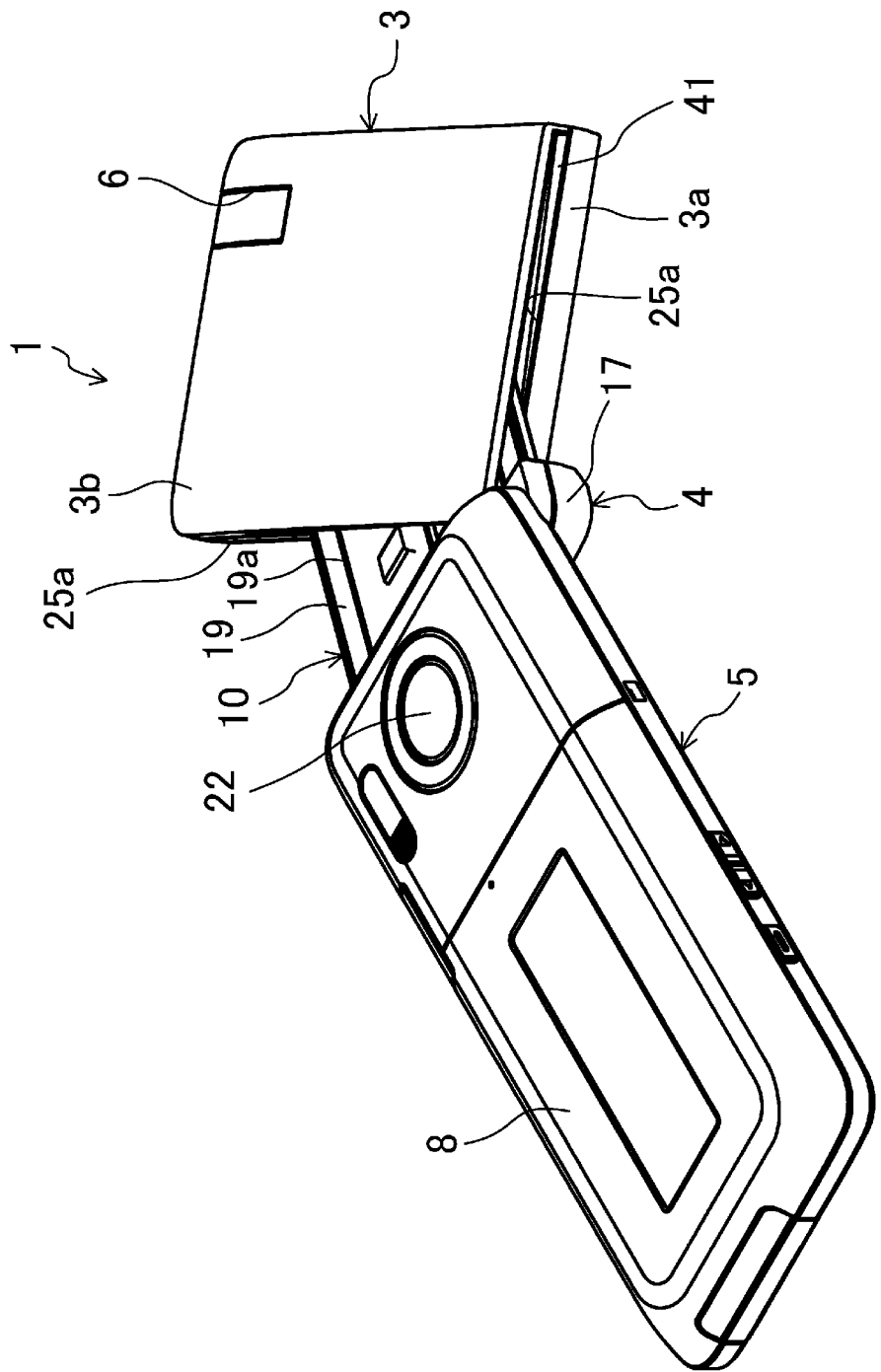
FIG. 7 is a perspective view illustrating the mobile phone from the back side thereof when the rotary housing is being switched to the vertical position or the horizontal position.

According to the foregoing configuration, in the state in which the plate spring 43 is arranged on a back side of the lower closing member body 41a, the lower closing member body 41a is arranged so as to tilt (slide) in the thickness direction of the rotary housing 3 in the closing member accommodation part 42. That is, as illustrated in FIG. 7, the lower closing member body 41a contacting the rotation support mechanism 10 is gradually pressed and tilts in the thickness direction of the rotary housing 3 in association with rotation of the rotation support mechanism 10, and therefore the rotation support mechanism 10 smoothly passes through the lower opening 25a and the side opening 25b. After the rotation support mechanism 10 passes, the lower closing member body 41a is pressed back by the plate spring 43 to close part of the lower opening 25a and part of the side opening 25b again. The appearance of the mobile phone 1 can be also enhanced if the lower closing member 41 has the same color as that of the back cabinet 3b.

Figure 17:
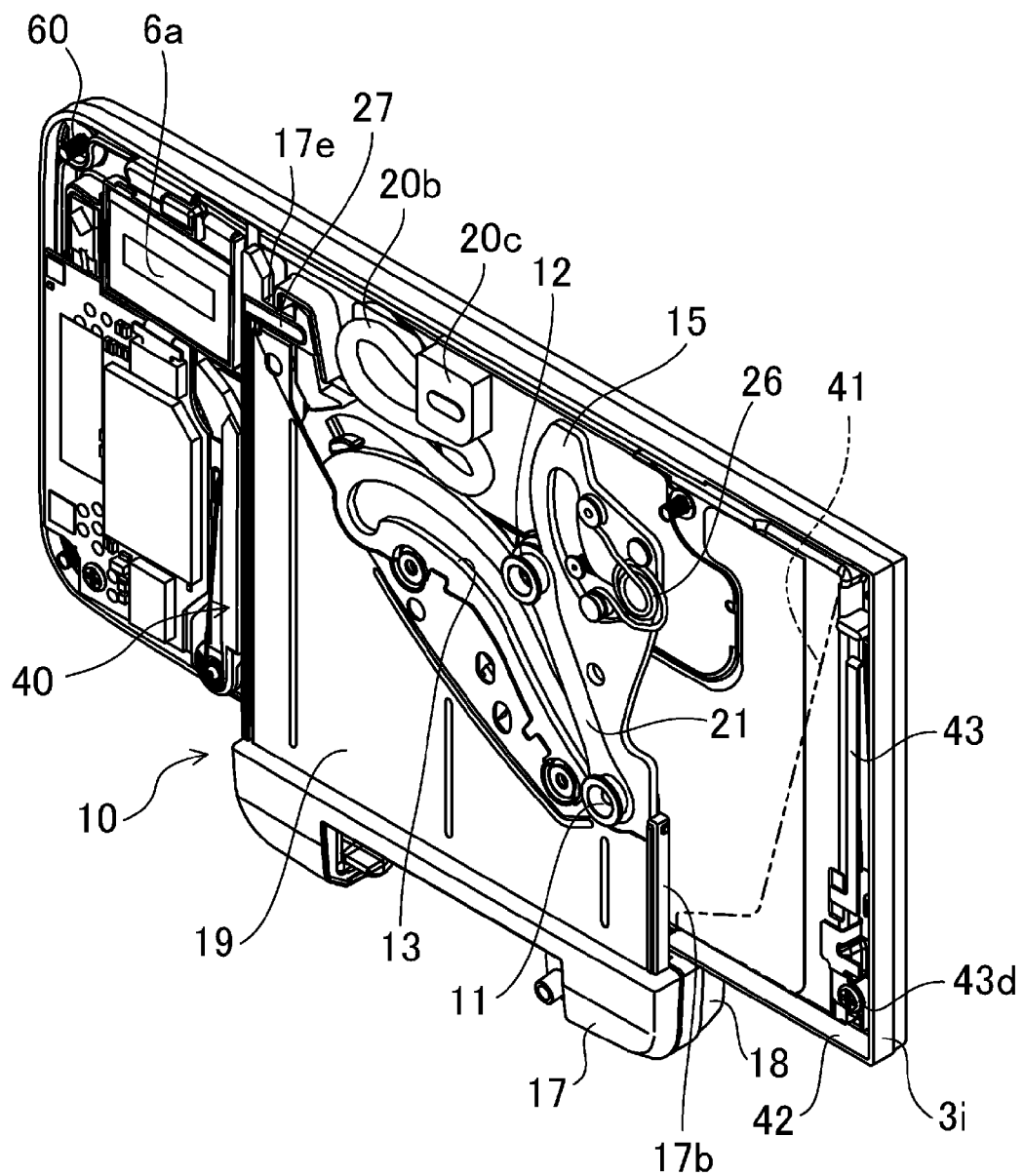
FIG. 17 is a view corresponding to FIG. 15 and illustrates the state in which the rotary housing is in the horizontal position.
Figure 20:
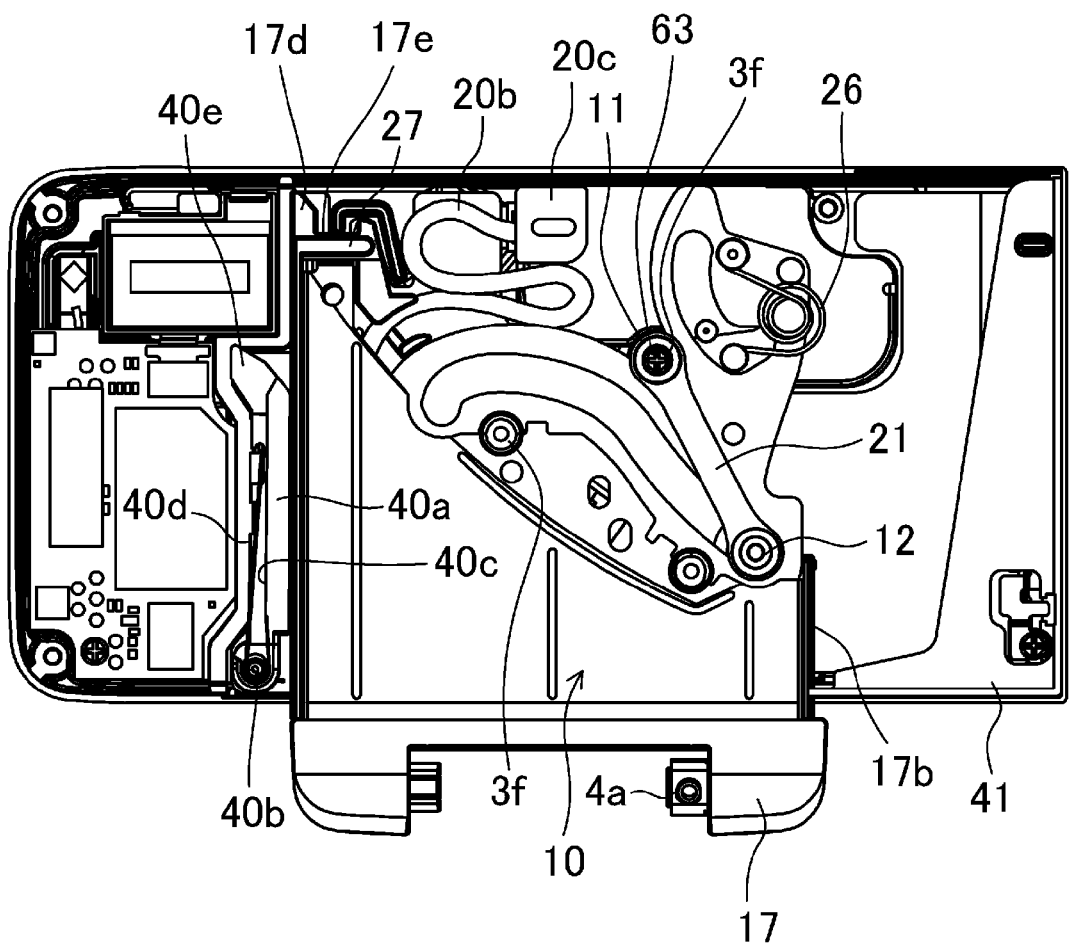
FIG. 20 is a view corresponding to FIG. 18 and illustrates the state in which the rotary housing is in the horizontal position.

According to the foregoing configuration, in a closed position as illustrated in FIG. 2 and the vertical position illustrated in FIG. 3, the side opening 25b is closed by the decorative side part 17b provided on a side closer to the hinge part 4 (on a lower side in the vertical position) and the side closing member 40. The guide plate 16, a lower part of the front hinge housing 17, and a lower part of the back hinge housing 18 are positioned in the lower opening 25a. In the horizontal position illustrated in FIG. 8, the side closing member 40 is accommodated in the front cabinet 3a as illustrated in FIGS. 17 and 20. In addition, the guide plate 16, the front hinge housing 17, and the back hinge housing 18 are accommodated in part of the side opening 25b (an upper part in the vertical position illustrated in FIG. 3), and part of the side opening 25b at a lower corner and the lower opening 25a are closed by the lower closing member 41. When the closing members 40 and 41 are closed, surfaces of the closing members 40 and 41 substantially continue to a surface of the rotary housing 3.

Operation

Next, an operation of the mobile phone 1 of the present embodiment will be described.

First, as illustrated in FIG. 2, when the mobile phone 1 is not used or in a standby position, the rotary housing 3 and the fixed housing 5 are folded against each other. In such a state, the rotation support mechanism 10 is accommodated in the movement opening 25 of the rotary housing 3. The guide hole 13 and the rail 15 are formed in the flat plate-shaped guide plate 16 made of stainless steel. As long as the thin guide plate 16, the front hinge housing 17, and the back hinge housing 18 can move in the movement opening 25, the width of the movement opening 25 is reduced. Thus, the thickness of the entirety of the rotary housing 3 is also reduced. In addition, since the side opening 25b is covered by the side closing member 40 and the decorative side part 17b, the surface of the rotary housing 3 looks like a substantially continuous surface. Thus, since the rotation support mechanism 10 does not protrude, and the mobile phone 1 looks, at first glance, like a typical foldable mobile phone without the rotation support mechanism 10, the appearance of the mobile phone 1 is enhanced.

As illustrated in FIG. 3, when the rotary housing 3 opens relative to the fixed housing 5, the display 2 and the operation part 7 appear. For calling, sending/receiving of mails, etc. for ordinal use, the operation part 7 is used for key input with the display 2 being in the vertical position. As illustrated in FIGS. 1, 15, 18, 22, and 23, when the rotary housing 3 is in the vertical position, the first slide pin 11 is positioned in a left end part of the guide hole 13 as viewed from a back side of the rotary housing 3, and the second slide pin 12 is positioned in a middle part of the rail 15 in the vertical direction as viewed from the back side of the rotary housing 3.

For viewing of a landscape image, such as viewing of digital terrestrial broadcasting and connection of the mobile phone 1 to the Internet, a user rotates the display 2 from the vertical position to the horizontal position.

Figure 16:
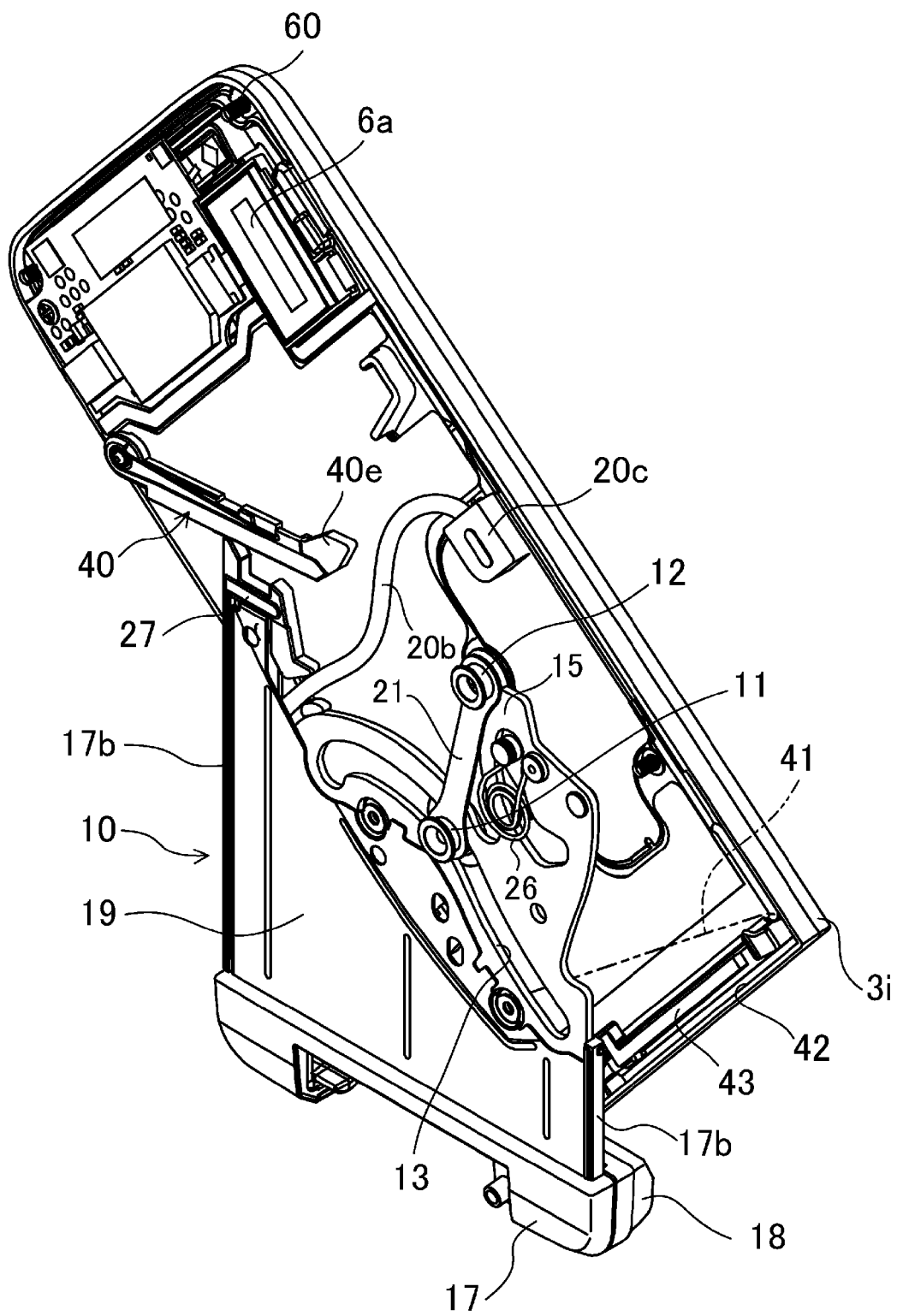
FIG. 16 is a view corresponding to FIG. 15 and illustrates the state in which the rotary housing is being switched to the vertical position or the horizontal position.
Figure 19:
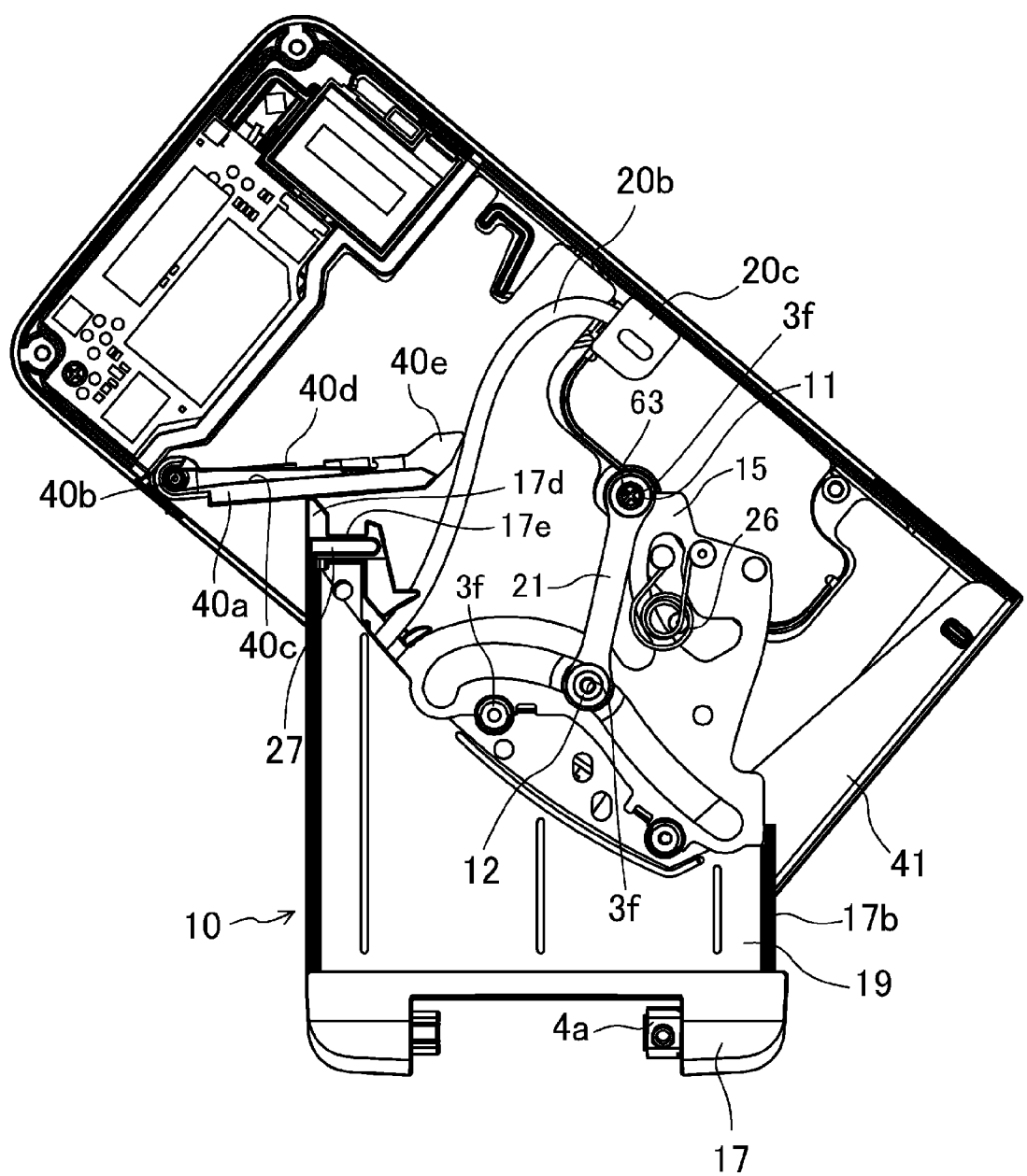
FIG. 19 is a view corresponding to FIG. 18 and illustrates the state in which the rotary housing is being switched to the vertical position or the horizontal position.
Figure 24:
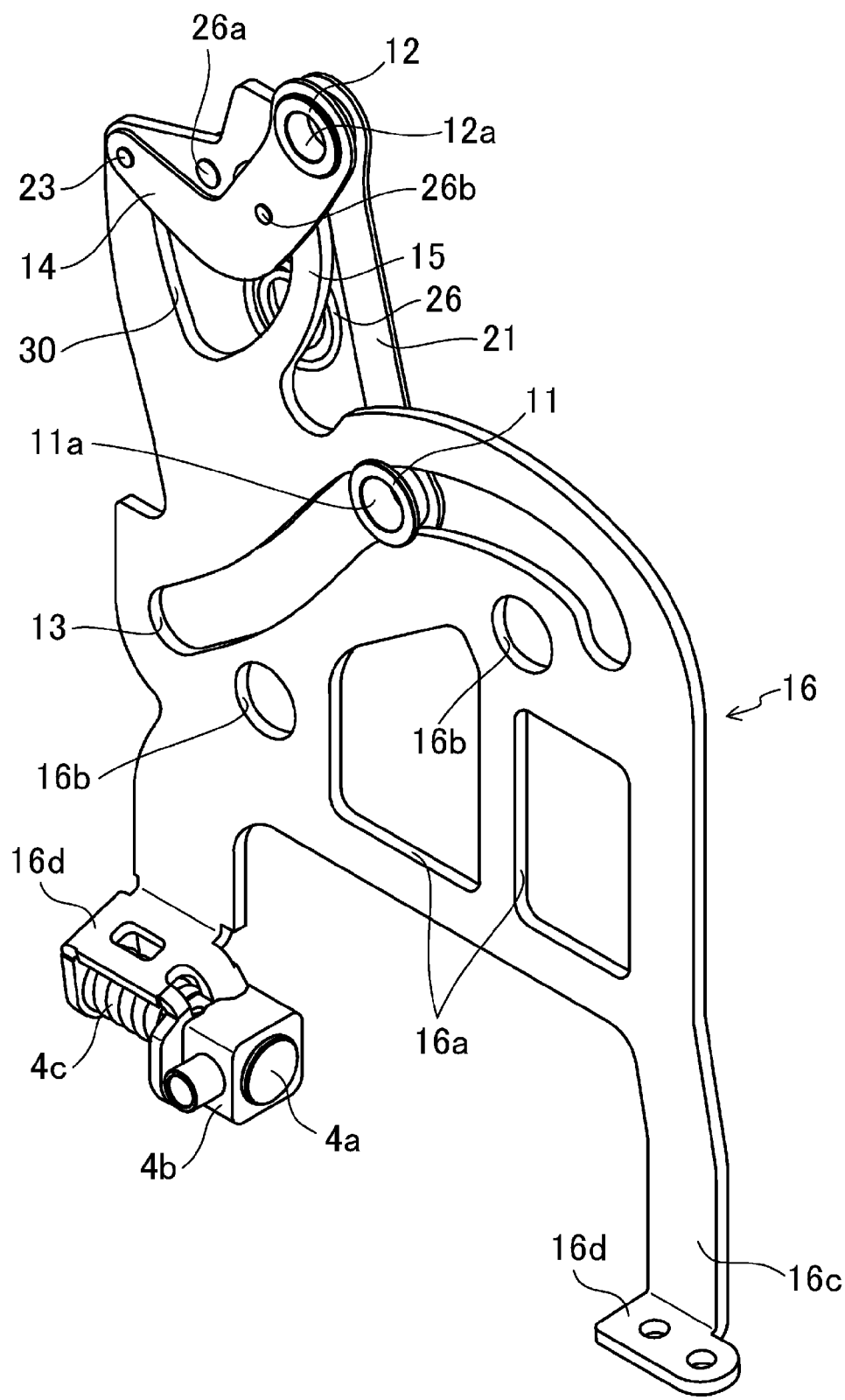
FIG. 24 is a view corresponding to FIG. 23 and illustrates the state in which the rotary housing is being switched to the vertical position or the horizontal position.

First, as illustrated in FIGS. 4 and 7, the user rotates the rotary housing 3 so as to move the lower corner 3i clockwise as viewed from the front side of the mobile phone 1. In such a state, as illustrated in FIGS. 16, 19, and 24, the second slide pin 12 positioned in the middle part of the rail 15 in the vertical direction as viewed from a back side of the mobile phone 1 moves to an substantially upper end of the rail 15, and the first slide pin 11 positioned at the left end of the guide hole 13 moves to the vicinity of the center of the guide hole 13 in the horizontal direction. At the same time, the linking member 14 upwardly rotates, and the torsion coil spring 26 stores the maximum elastic energy. When the first slide pin 11 passes beyond the vicinity of the center of the guide hole 13, biasing force of the torsion coil spring 26 assists in rotating the rotary housing 3. The upper end part 17d of the front hinge housing 17 pushes and tilts the side closing member body 40a in the thickness direction of the rotary housing 3, thereby rotating the side closing member 40. In addition, the decorative side part 17b on a side opposite to the upper end part 17d pushes down the lower closing member 41, thereby not blocking the rotation of the rotary housing 3. As illustrated in FIGS. 4 and 7, since front and back sides of the rotation support mechanism 10 are covered by the thin decorative plates 19, the appearance in part of the rotation support mechanism 10 protruding from the movement opening 25 is enhanced.

Figure 25:
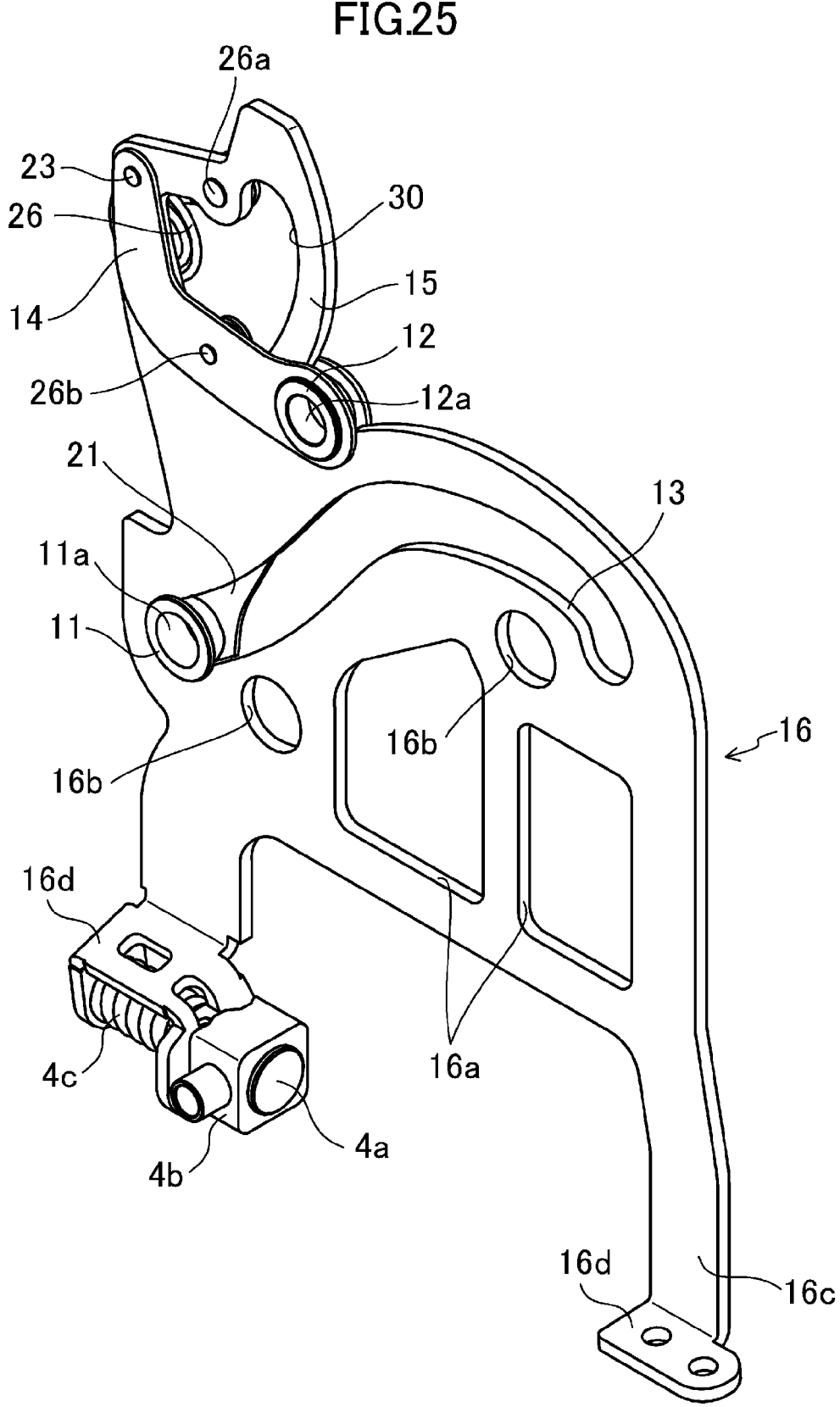
FIG. 25 is a view corresponding to FIG. 23 and illustrates the state in which the rotary housing is in the horizontal position.
Figure 26:
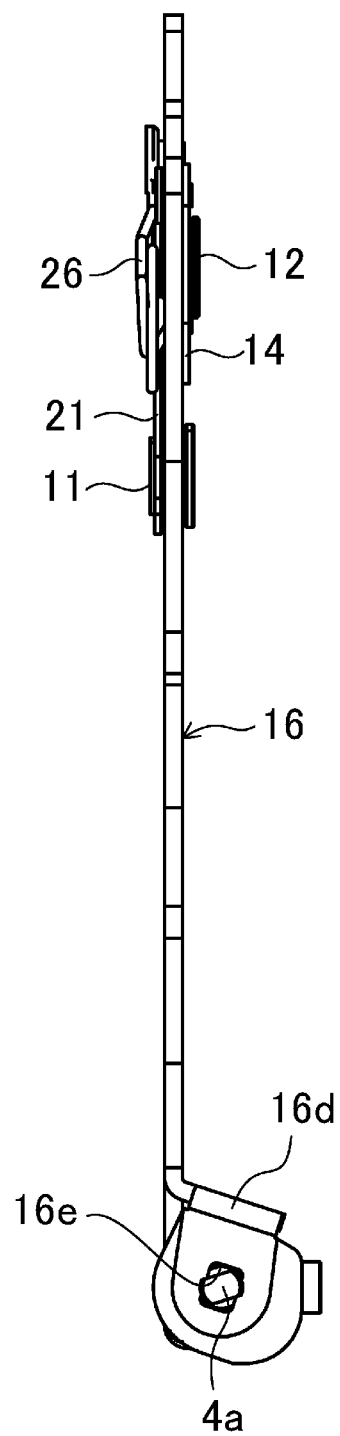
FIG. 26 is a left side view of the rotation support mechanism when the rotary housing is in the vertical position.
Figure 27:
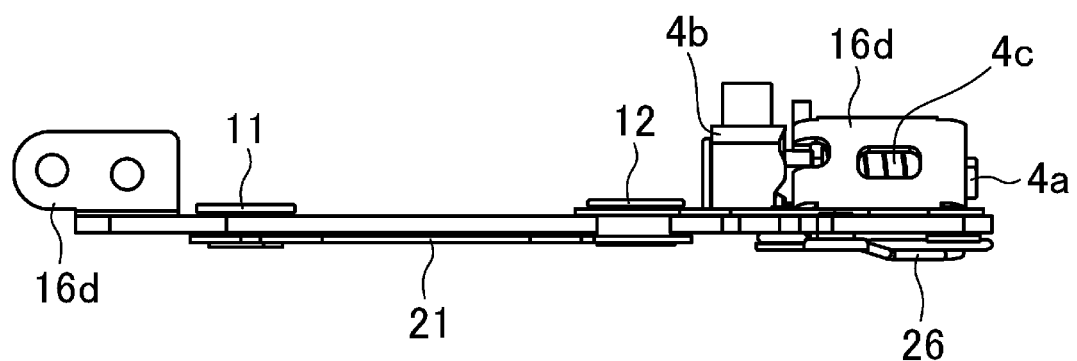
FIG. 27 is an upper view of the rotation support mechanism when the rotary housing is in the vertical position.
Figure 28:
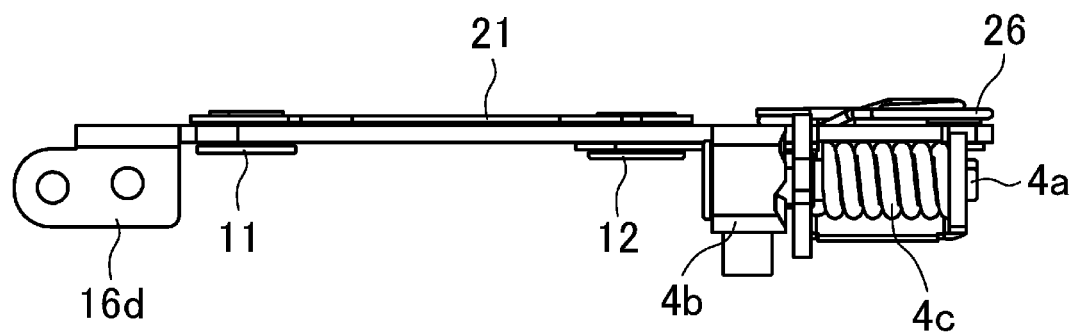
FIG. 28 is a bottom view of the rotation support mechanism when the rotary housing is in the vertical position.

Next, the display 2 is switched to the horizontal position illustrated in FIG. 5. In such a state, as illustrated in FIGS. 17, 20, and 25, the second slide pin 12 positioned at the upper end of the rail 15 as viewed from the back side of the mobile phone 1 moves to a lower end of the rail 15, and the first slide pin 11 positioned in the vicinity of the center of the guide hole 13 in the horizontal direction moves to a right end of the guide hole 13. As described above, the movement of the first slide pin 11 relative to the guide plate 16 is restricted by the guide hole 13, and the movement of the second slide pin 12 relative to the guide plate 16 in association with the movement of the first slide pin 11 is restricted by the linking member 14. A rotation pattern of the rotary housing 3 connected to the first slide pin 11 and the second slide pin 12, the movement of each of which is restricted, is controlled. At the moment when the first slide pin 11 slides in the guide hole 13, the second slide pin 12 moves in the state in which the 15 is fitted into the circular recess 12a of the second slide pin 12. Thus, the second slide pin 12 is not displaced in the thickness direction of the rotary housing 3, and the rotary housing 3 stably rotates. In such a case, since only part of the circular recess 12a slidably contacts the rail 15, friction resistance is smaller as compared to a conventional case where both ends of a second slide pin 12 slidably contact a peripheral edge of a guide hole 13. The friction resistance on the second slide pin 12 is small. Thus, the function to assist in the rotation of the rotary housing 3 by the torsion coil spring 26 is fulfilled, and the rotary housing 3 is automatically switched to the horizontal position without applying force.

Since a guide hole is not required for the second slide pin 12, the guide plate 16 is not necessarily provided so as to extend above an upper end of a pin slidable region of the guide hole. Thus, an upper end position of the guide plate 16 is lowered, thereby lowering the position of the rotary housing 3 in the horizontal position. In addition, the height position of the second slide pin 12 (the distance from the hinge part 4 to the second slide pin 12) when the rotary housing 3 is in the horizontal position is lower than that when the rotary housing 3 is in the vertical position (see FIGS. 18 and 20). As described above, by adjusting the shape of the guide hole 13, the height position of the second slide pin 12 when the rotary housing 3 is in the horizontal position is lowered. The foregoing functions allows, as illustrated in FIGS. 3 and 5, reduction in size of a clearance between the hinge part 4 and a lower side of the rotary housing 3 in the vertical position and reduction in size of a clearance between the hinge part 4 and a lower side of the rotary housing 3 in the horizontal position, thereby enhancing the appearance of the mobile phone 1.

As illustrated in FIGS. 3-8, the rotation support mechanism 10 moves while gradually pushing the side closing member 40 and the lower closing member 41, and the side closing member 40 and the lower closing member 41 gradually return to original positions thereof after the movement of the rotation support mechanism 10. Since the movement opening 25 gradually opens during the rotation of the rotary housing 3, dust is less likely to enter the movement opening 25. In addition, e.g., a finger is less likely to be caught in the movement opening 25, thereby ensuring safety.

The lower corner 3i is supported and guided in the pattern in which a predetermined clearance is maintained between the lower corner 3i and the hinge part 4. Thus, the display 2 does not contact the hinge part 4 even without, as in a conventional case, rounding a lower end of a display 2 along an arc having a radius about a support shaft of the display 2. Since the corners of the rotary housing 3 are not necessarily rounded, the size of the display 2 can be increased. This allows the user to easily view an image.

Since the rotation support mechanism 10 always moves in the movement opening 25 during the rotation of the rotary housing 3, the rotation support mechanism 10 is loosened only in a clearance between the rotation support mechanism 10 and the movement opening 25, resulting in the stable rotation of the rotary housing 3. If the raised part 27 constantly contacts the slide recess 28 of the rotary housing 3, loosening of the rotary housing 3 can be further prevented with a simple configuration. In addition, the protrusions 19a of the thin decorative plate 19 minimize the clearance between the thin decorative plate 19 and the rotary housing 3, the loosening upon the rotation of the rotary housing 3 is further prevented.

In the horizontal position illustrated in FIG. 5, a middle part of the display 2 in the horizontal direction is positioned substantially in the middle of the rotary housing 3 in the horizontal direction. In such a state, while holding the fixed housing 5, the user can view an image on the rotary housing 3 in the horizontal position. In the state in which the mobile phone 1 is set such that the size of a landscape image to be displayed on the display 2 is increased, e.g., the followings are available via TV by the key input using the operation part 7: participating a quiz show; TV shopping; and making payment through a bank transfer. In the state in which the rotary housing 3 is in the horizontal position and the mobile phone 1 opens, the mobile phone 1 is mounted on a desk such that the back side of the fixed housing 5 faces the desk, thereby allowing viewing of a TV image on the display 2 in the horizontal position for a long period of time. Even when the rotary housing 3 is in the horizontal position, the rotation support mechanism 10 can be accommodated in the movement opening 25 of the rotary housing 3. Thus, the rotation support mechanism 10 does not protrude, thereby enhancing the appearance of the mobile phone 1.

After use of the mobile phone 1, the user rotates, in the way opposite to the foregoing, the rotary housing 3 so as to move the lower corner 3i positioned on a lower right side of the display 2 counterclockwise as viewed from the front side of the mobile phone 1, thereby returning the display 2 to the vertical position. In such a state, the rotation support mechanism 10 also moves while gradually pushing the side closing member 40 and the lower closing member 41, and the side closing member 40 and the lower closing member 41 gradually return to the original positions thereof after the movement of the rotation support mechanism 10.

Then, the rotary housing 3 and the fixed housing 5 are folded against each other, thereby changing the mobile phone 1 to the standby position.

According to the configuration described above, even if an unexpected impact is applied to the rotary housing 3, a load is also transmitted to the periphery of the movement opening 25. Thus, concentration of the load only on the rotation support mechanism 10 is prevented, thereby effectively preventing damage of the rotation support mechanism 10.

The movement opening 25 is covered by the closing members 40 and 41, and the surfaces of the closing members 40 and 41 and the surface of the rotary housing 3 looks as a continuous surface. Thus, the appearance of the mobile phone 1 can be significantly enhanced, and dust can be prevented from entering the rotary housing 3 through the movement opening 25. Further, e.g., a finger is less likely to enter the movement opening 25, thereby improving the safety.

Since the contact of the rotary housing 3 with the hinge part 4 is prevented by adjusting the shapes of the guide hole 13 and the rail 15 as in the foregoing embodiment, the corners of the rotary housing 3 are not necessarily rounded, and the size of the rotary housing 3 can be increased. Thus, a TV image or an Internet site image can be comfortably viewed with the large display 2.

Since the guide plate 16 is sandwiched between the connection member 21 and the linking member 14 in the state in which the first slide pin 11 and the second slide pin 12 are connected together through the connection member 21, the rotation support mechanism 10 can be assembled into a unit. Thus, assembly of the mobile phone 1 can be significantly improved.

According to the mobile phone 1 of the foregoing embodiment, the first and second slide pins 11 and 12 connected to the rotary housing 3 and the guide hole 13 restricting the sliding of the first slide pin 11 are provided in the guide plate 16 of the rotation support mechanism 10, and the second slide pin 12 and the rotary shaft 23 provided in the guide plate 16 are connected together through the linking member 14. Thus, the appearance of the mobile phone 1 can be enhanced with the reduced friction resistance of the rotation support mechanism 10 and the reduced size of the mobile phone 1.

Variation

Figure 45:
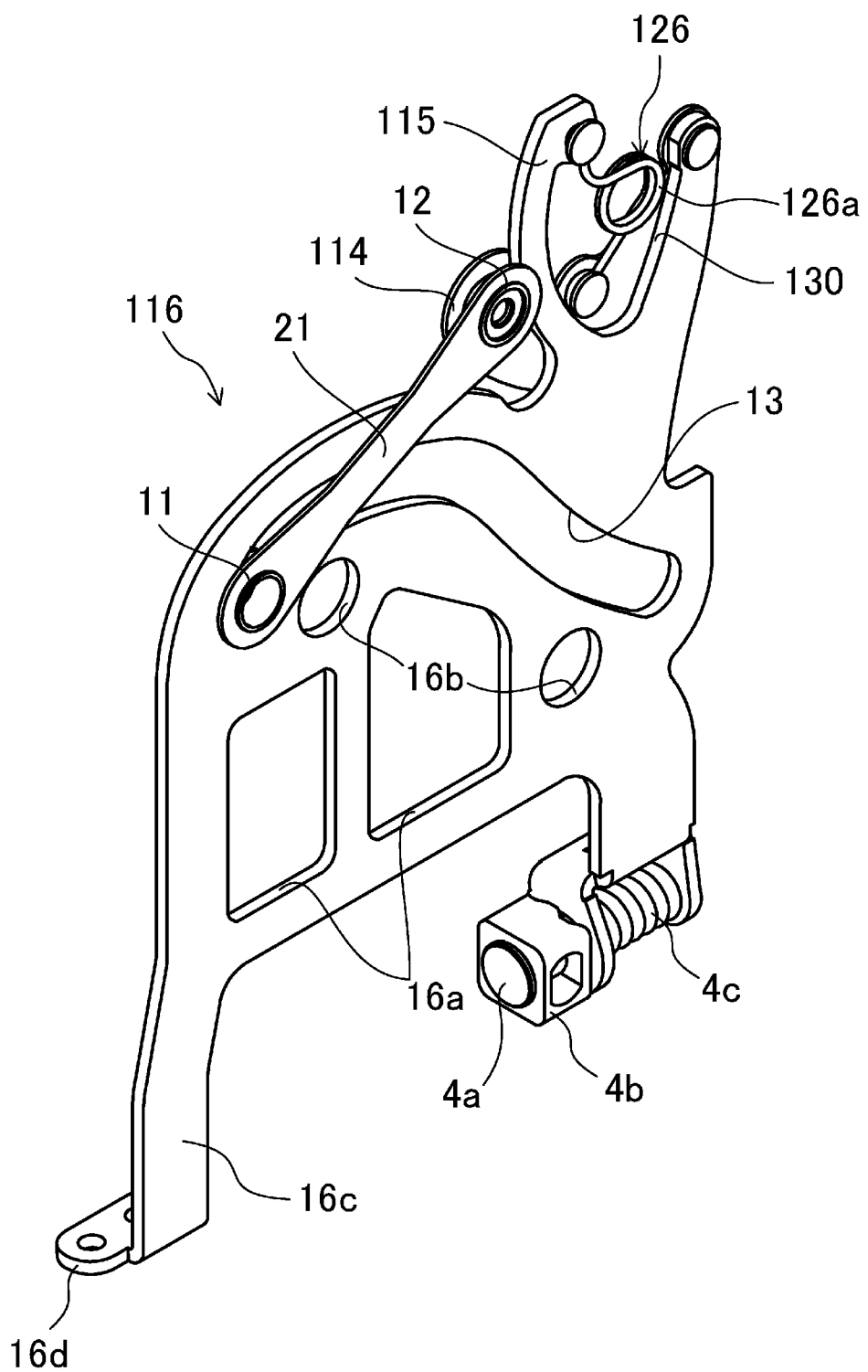
FIG. 45 is a perspective view illustrating a main part of a rotation support mechanism when a rotary housing of a variation of the embodiment of the present invention is in a vertical position.
Figure 46:
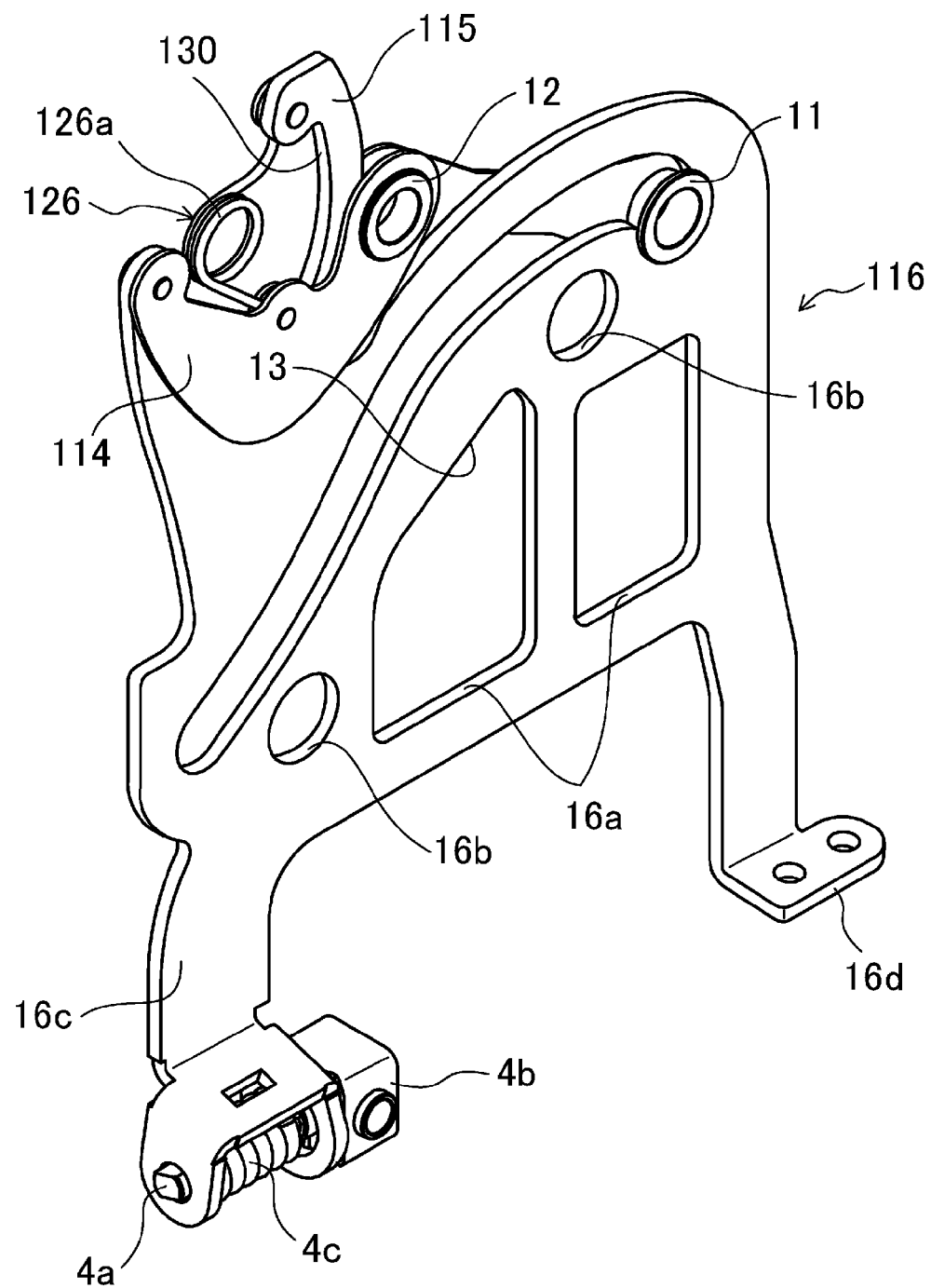
FIG. 46 is a view of the main part of the rotation support mechanism of the variation of the embodiment of the present invention in another direction corresponding to FIG. 45.

FIGS. 45 and 46 illustrate a variation of the embodiment of the present invention, and the variation is different from the foregoing embodiment especially in arrangement of a torsion coil spring 126. Note that the same reference characters as those shown in FIGS. 1-44 are used to represent equivalent elements in FIGS. 45 and 46, and the description thereof will not be repeated.

That is, in the foregoing embodiment, the torsion coil spring 26 is provided as the elastic member such that a coiled part thereof is arranged on the back side of the guide plate 16. The torsion coil spring 126 of the present variation is rotatably connected to an upper end of a rail 115 at one end, and is rotatably connected to a linking member 114 at the other end. In the present variation, a spring opening 130 is formed such that part of the guide plate 116 above the spring opening 130 is not continuous.

A coiled part 126a of the torsion coil spring 126 is arranged near the rail 115 in such a position that the coiled part 126a does not overlap with part of a guide plate 116 on a side opposite to a second slide pin 12, and the height (thickness) of the coiled part 126a in a direction in which the number of turns of the coiled part 126a increases is equal to or less than the sum of the thicknesses of the guide plate 116, a connection member 21, and the linking member 114.

As described above, the coiled part 126a determining the height of the torsion coil spring 126 is arranged near the rail 115 so as not to overlap with the guide plate 116. In addition, since the height of the coiled part 126a is equal to or less than the sum of the thicknesses of the guide plate 116, the connection member 21, and the linking member 114, the thickness of a rotation support mechanism 10 does not increase due to the torsion coil spring 126.

OTHER EMBODIMENT

The present invention may have the following configurations in the foregoing embodiment.

That is, in the foregoing embodiment, the rotation support mechanism 10 moves in the movement opening 25 of the rotary housing 3. However, the rotation support mechanism 10 of the foregoing embodiment may be used to support the liquid crystal display part, i.e., a rotary housing, such that the liquid crystal display part is switchable between the vertical position and the horizontal position on a front side of the first housing as in Patent Document 1.

In the foregoing embodiment, the guide plate 16 is formed such that part of the guide plate 16 at the upper end thereof extends above the rail 15. However, the guide plate 16 is not necessarily formed as described above, and the position of the upper end of the guide plate 16 can be lowered. In addition, the spring opening 30 may be formed such that part of the guide plate 16 above the spring opening 30 is not continuous as in the foregoing variation.

In the foregoing embodiment, the display 2 is incorporated in the rotary housing 3. However, the display 2 may be provided in each of the rotary housing 3 and the fixed housing 5, or may be provided only in one of the rotary housing 3 or the fixed housing 5. In addition, the display 2 may be a touch panel. Further, in the foregoing embodiment, the operation part 7 is provided only in the fixed housing 5. However, the operation part 7 may be provided only in the rotary housing 3, and the display 2 may be provided in the fixed housing 5. Alternatively, the display 2 may be provided in the rotary housing 3, and the operation part 7 including a function key etc. and having a simple configuration may be provided in part of the rotary housing 3.

The guide hole 13 and the linking member 14 are formed in suitable shapes, thereby obtaining the suitable rotation pattern of the rotary housing 3. That is, in the foregoing embodiment, the rotary housing 3 is supported so as to, as viewed from a front side of the rotary housing 3, rotate clockwise from the vertical position to the horizontal position by the rotation support mechanism 10 and rotate back from the horizontal position to the vertical position. However, the rotary housing 3 may rotate counterclockwise from the vertical position to the horizontal position as viewed from the front side of the rotary housing 3. In such a case, the rotation support mechanism 10 and the movement opening 25 may be arranged in horizontally reversed positions.

In the foregoing embodiment, the first slide pin 11 and the second slide pin 12 are temporarily fixed to the plate-shaped connection member 21, but the present invention is not limited to the foregoing configuration. The fixing holes 3f or the fixing holes 3h themselves may be used as the first slide pin 11 and the second slide pin 12.

In the foregoing embodiment, the hinge boss parts 17a and 18a are provided on the right and left sides of the rotary housing 3, and the protrusion 5a is provided at the upper end of the fixed housing 5. However, a pair of hinge boss parts may protrude from the upper end of the fixed housing 5, and a protrusion extending from a lower end of the rotary housing 3 may be sandwiched between the hinge boss parts.

In the foregoing embodiment, the foldable mobile phone 1 has been described as the mobile terminal, but the present invention may relates to a so-called "straight-type mobile terminal" in which the fixed housing 5 and the rotary housing 3 are connected together so as not to be folded against each other. In such a case, the rotation support mechanism 10 may be directly connected to the fixed housing 5 without the hinge part 4. Even in the straight-type mobile terminal, the rotation support mechanism 10 is accommodated in the movement opening 25 of the rotary housing 3, thereby enhancing the appearance of the mobile terminal.

The entirety of the fixed housing 5 may be movable in the movement opening 25 upon the rotation of the rotary housing 3. In such a case, the mobile phone 1 may be in a compact shape in which the entirety of the fixed housing 5 is accommodated in the movement opening 25 of the rotary housing 3.

In the foregoing embodiment, the display 2 may be a liquid crystal display or an organic EL display. In the organic EL display, power consumption for emitting light is small, and the angle of visibility is wider as compared to that of the liquid crystal display. In addition, no backlight is required for the organic EL display, thereby reducing the thickness thereof. The liquid crystal display is more inexpensive and has longer life expectancy as compared to those of the organic EL display.

In the foregoing embodiment, the foldable mobile phone has been described as the mobile terminal, but the mobile terminal may be, e.g., PHSs, PDAs, PCs, mobile tools, electronic dictionaries, calculators, and game machines.

Note that the foregoing embodiment has been set forth merely for purposes of preferred examples in nature, and is not intended to limit the scope, applications, and use of the invention.

INDUSTRIAL APPLICABILITY

As described above, the present invention is useful as the mobile terminal such as the mobile phone in which the rotary housing is supported so as to rotate between the vertical position and the horizontal position.

DESCRIPTION OF REFERENCE CHARACTERS

1 Foldable Mobile Phone (Mobile Terminal)
3 Rotary Housing
3i Lower Corner
4 Hinge Part
4a Hinge Shaft
10 Rotation Support Mechanism
11 First Slide Pin (First Slide Member)
12 Second Slide Pin (Second Slide Member)
12a Circular Recess
13 Guide Hole
14 Linking Member
15 Rail
16 Guide Plate
16d Extension
16e Hinge Shaft Insertion Hole
19 Thin Decorative Plate
21 Connection Member
23 Rotary Shaft
25 Movement Opening
26 Torsion Coil Spring (Elastic Member)
30 Spring Opening
41 Lower Closing Member
41a Lower Closing Member Body (Closing Member Body)
41d Retaining Part
43 Plate Spring
114 Linking Member
115 Rail
116 Guide Plate
126 Torsion Coil Spring (Elastic Member)
126a Coiled Part

The invention claimed is:

1. A mobile terminal, comprising:
a rotary housing;
a fixed housing; and
a rotation support mechanism for supporting the rotary housing connected to the fixed housing such that the rotary housing rotates between a vertical position and a horizontal position,
wherein the rotation support mechanism includes
a guide plate,
first and second slide members connected to the rotary housing and sliding along the guide plate upon rotation of the rotary housing,
a guide hole formed in the guide plate and restricting sliding of the first slide member, and
a linking member connecting the second slide member to a rotary shaft provided in the guide plate such that a distance between the second slide member and the rotary shaft is maintained constant.

2. The mobile terminal of claim 1, wherein
a circular recess is formed around the second slide member, and
a rail fitted into the circular recess and restricting the second slide member such that the second slide member is not displaced in a thickness direction of the guide plate is formed above the guide hole in the guide plate.

3. The mobile terminal of claim 1, wherein
a distance between the second slide member and the guide hole when the rotary housing is in the horizontal position is shorter than that when the rotary housing is in the vertical direction.

4. The mobile terminal of claim 1, wherein
the guide plate and the linking member are plates,
the first and second slide members are connected together through a plate-shaped connection member arranged on one side of the guide plate,
the linking member is arranged on the other side of the guide plate, and
the guide plate is sandwiched between the connection member and the linking member.

5. The mobile terminal of claim 4, wherein
an elastic member assisting in the rotation of the rotary housing is connected to at least one of the connection member or the linking member, and
the elastic member is attached to the guide plate in a state in which the first and second slide members are connected together through the connection member.

6. The mobile terminal of claim 5, wherein
the elastic member is an torsion coil spring, at one end thereof, rotatably connected to an upper end part of the guide plate on a side on which the connection member is arranged and, at the other end, rotatably connected to the linking member on the side on which the connection member is arranged with the torsion coil spring passing through a spring opening formed along a rail.

7. The mobile terminal of claim 5, wherein
the elastic member is an torsion coil spring, at one end thereof, rotatably connected to an upper end part of a rail and, at the other end, rotatably connected to the linking member, and
a coiled part of the torsion coil spring is arranged near the rail in such a position that the coiled part does not overlap with part of the guide plate on a side opposite to the second slide member, and a height of the coiled part is equal to or less than a sum of thicknesses of the guide plate, the connection member, and the linking member.

8. The mobile terminal of claim 1, wherein
a movement opening in which movement of the rotation support mechanism is allowed is formed in the middle of a side surface of the rotary housing in a thickness direction thereof.

9. The mobile terminal of claim 8, further comprising:
a lower closing member configured to, by the rotation support mechanism moving in the movement opening, be slid and tilt in the thickness direction of the rotary housing to close part of the movement opening at a lower corner of the rotary housing in the horizontal position or to be accommodated in the rotary housing in the vertical position,
wherein the lower closing member includes
a lower closing member body arranged at the lower corner of the rotary housing, and
a plate spring biasing the lower closing member body in a direction in which the movement opening is closed.

10. The mobile terminal of claim 9, wherein
the rotation support mechanism is covered by a thin plate made of metal, and
the lower closing member body is a resin mold component.

11. The mobile terminal of claim 9, wherein
a retaining part for preventing detachment of the lower closing member body from the rotary housing upon assembly is provided in the lower closing member body.

12. The mobile terminal of claim 1, wherein
the rotary housing and the fixed housing are foldably connected together through a hinge part, and
an end part of the guide plate on a side closer to the hinge part is bent, and a hinge shaft including a biasing mechanism for assisting in a folding operation of the rotary housing and the fixed housing is unrotatably attached to a hinge shaft insertion hole formed in a bent part of the guide plate.

* * * * *